(12) United States Patent
Qiu et al.

(10) Patent No.: US 10,257,007 B2
(45) Date of Patent: Apr. 9, 2019

(54) SIGNAL PROCESSING METHOD AND DEVICE

(71) Applicant: Huawei Technologies Co., Ltd., Shenzhen (CN)

(72) Inventors: Jing Qiu, Chengdu (CN); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/023,539

(22) Filed: Jun. 29, 2018

(65) Prior Publication Data

US 2018/0309606 A1 Oct. 25, 2018

Related U.S. Application Data

(63) Continuation of application No. PCT/CN2016/096692, filed on Aug. 25, 2016.

(30) Foreign Application Priority Data

Dec. 31, 2015 (CN) .......................... 2015 1 1032383

(51) Int. Cl.
  *H04L 27/26* (2006.01)
  *H04L 25/03* (2006.01)
(52) U.S. Cl.
  CPC ...... *H04L 27/264* (2013.01); *H04L 25/03828* (2013.01); *H04L 27/26* (2013.01); *H04L 27/2649* (2013.01)

(58) Field of Classification Search
  CPC .............. H04L 27/264; H04L 25/03828; H04L 27/2649; H04L 27/26
  See application file for complete search history.

(56) References Cited

U.S. PATENT DOCUMENTS 9,197,364 B1 * 11/2015 von der Embse ...... H04L 27/34
2008/0043866 A1 * 2/2008 Mujtaba .............. H04L 27/2628
  375/260

(Continued)

FOREIGN PATENT DOCUMENTS

EP 2840749 A1 2/2015

*Primary Examiner* — Dac V Ha
(74) *Attorney, Agent, or Firm* — Leydig, Voit & Mayer, Ltd.

(57) ABSTRACT

The present application relates to a filtering scheme with low complexity. The method includes: dividing an orthogonal frequency division multiplexing (OFDM) signal into a first sideband signal, a first signal, and a second sideband signal; sampling the first sideband signal by using a first sampling rate; sampling the first signal by using a second sampling rate; sampling the second sideband signal by using a third sampling rate; and separately performing filtering processing of a third spectral mask, upsampling processing, and digital frequency conversion processing to generate a first filtered-OFDM (f-OFDM) signal, a second f-OFDM signal and a third f-OFDM signal; and superposing the first f-OFDM signal, the second f-OFDM signal, and the third f-OFDM signal to obtain an f-OFDM signal, where the first sampling rate and the third sampling rate are both less than the second sampling rate.

20 Claims, 13 Drawing Sheets

(56) References Cited

U.S. PATENT DOCUMENTS

2014/0355726 A1* 12/2014 Elenes .............. H04L 25/03834
375/343
2015/0229502 A1  8/2015 Vilaipornsawai et al.
2015/0256308 A1  9/2015 Ma et al.

* cited by examiner

SIGNAL PROCESSING METHOD AND DEVICE

CROSS-REFERENCE TO RELATED APPLICATIONS

This application is a continuation of International Application No. PCT/CN2016/096692, filed on Aug. 25, 2016, which claims priority to Chinese Patent Application No. 201511032383.1, filed on Dec. 31, 2015. The disclosures of the aforementioned applications are hereby incorporated by reference in their entireties.

TECHNICAL FIELD

The present application relates to the field of wireless communications technologies, and in particular, to a signal processing method and a device.

BACKGROUND

In diverse service scenarios of the fifth generation mobile communications technology (5G), different orthogonal frequency division multiplexing (OFDM) waveform parameters are required for the service scenarios. However, it is an inevitable requirement on a 5G basic waveform that an OFDM waveform parameter can be dynamically selected and configured based on a service scenario while advantages of conventional OFDM are also considered.

Filtered-OFDM (f-OFDM for short) based on an OFDM subband is a waveform technology that can meet a 5G requirement. In the f-OFDM waveform technology, a system bandwidth is divided into a plurality of OFDM subband frequency-domain signals. Each OFDM subband has features of a conventional OFDM waveform, and a high-order digital shaping filter is used to perform OFDM subband filtering on each OFDM subband. Because the high-order digital shaping filter is used to perform OFDM subband filtering in a time domain, each filtered OFDM subband has favorable out-of-band performance in a frequency domain, so that decoupling of each OFDM subband waveform is implemented. Further, a different waveform parameter can be configured for each OFDM subband based on an actual service scenario while advantages of the conventional OFDM waveform are combined. For example, FIG. 1 is a schematic diagram of processing an OFDM subband frequency-domain signal in the prior art. A bandwidth of the OFDM subband frequency-domain signal is 20 MHz. As shown in FIG. 1, a 2048-point inverse fast Fourier transform (IFFT) is first performed on the OFDM subband frequency-domain signal to obtain a time-domain signal. A cyclic prefix is added to each time-domain signal, and a high-order digital shaping filter filters each signal to which the cyclic prefix has been added. All filtered signals are combined and transmitted by means of radio frequency (RF).

The high-order digital shaping filter is used in the f-OFDM waveform technology, to make a filtered signal have favorable out-of-band performance (for example, a very narrow transition band), overheads of guard space required between adjacent OFDM subbands may be very low, and even no guard space is required in most scenarios. However, because OFDM subband signals in f-OFDM are all broadband signals (for example, it is specified in Long Term Evolution (LTE) that a bandwidth of an OFDM signal is 20 MHz), and a signal sampling rate is high, if such high-order time domain filtering is performed at a relatively high sampling rate, implementation complexity is very high, and for an entire system, the following problems are caused: (1) For a terminal, filtering with high complexity is adverse to energy saving of the terminal, and in particular, for numerous low-cost terminals that may exist in the system, implementation of the high-order digital shaping filter is a relatively big bottleneck. (2) A high-order digital filter needs to take a relatively long processing time on either a transmitter side or a receiver side, and this is especially adverse to a typical ultra-low delay service requirement in 5G. Therefore, to design a digital shaping filtering scheme with low complexity becomes a core issue of the f-OFDM technology.

SUMMARY

To resolve the foregoing problems, embodiments of the present application provide a signal processing method and a device, to implement a digital shaping filtering scheme with low complexity, so that complexity of a filtering operation can be greatly reduced, and f-OFDM can be more easily implemented.

To achieve the foregoing objective, the following technical solutions are used in the embodiments of the present application.

According to a first aspect, an embodiment of the present application provides a signal processing method, used to transmit an orthogonal frequency division multiplexing OFDM signal, where the method may include:

processing the OFDM signal based on a preset filtering policy, to obtain an f-OFDM signal; and transmitting the f-OFDM signal, where the filtering policy is:

dividing a to-be-transmitted OFDM signal into a first sideband signal, a first signal, and a second sideband signal, where the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal;

sampling the first sideband signal by using a first sampling rate, and performing filtering processing of a first spectral mask, upsampling processing, and digital frequency conversion processing on the sampled signal by using the first sampling rate, to generate a first f-OFDM signal;

sampling the first signal by using a second sampling rate, and performing filtering processing of a second spectral mask on the sampled signal by using the second sampling rate, to generate a second f-OFDM signal;

sampling the second sideband signal by using a third sampling rate, and performing filtering processing of a third spectral mask, upsampling processing, and digital frequency conversion processing on the sampled signal by using the third sampling rate, to generate a third f-OFDM signal; and superposing the first f-OFDM signal, the second f-OFDM signal, and the third f-OFDM signal to obtain the f-OFDM signal, where the first sampling rate and the third sampling rate are both less than the second sampling rate; a transition band of the first spectral mask and a transition band of the third spectral mask are both less than a transition band of the second spectral mask; and the first spectral mask, the second spectral mask, and the third spectral mask are used to: ensure that an out-of-band leakage of the filtered OFDM signal meets a first preset threshold.

The first preset threshold may be set as needed. This is not limited in this embodiment of the present application. When a bandwidth of a transition band of a signal is less than the first preset threshold, it indicates that a transition band of a spectral mask used when the f-OFDM signal is obtained is relatively narrow. When a bandwidth of a transition band of a signal is greater than the first preset threshold, it indicates that a transition band of a spectral mask used when the f-OFDM signal is used is relatively broad.

In this way, compared with the prior art, in the present application, an OFDM broadband signal is divided into two sideband signals and one intermediate signal. Filtering processing of a spectral mask with a relatively narrow transition band is performed on the two sideband signals. Filtering processing of a spectral mask with a relatively broad transition band is performed on the intermediate signal. The sideband signal is at an edge location. Therefore, even though the spectral mask with a relatively narrow transition band needs to be used to perform filtering, to achieve excellent out-of-band performance, because a bandwidth of a sideband is relatively narrow and a sampling rate is low, a work sampling rate of digital shaping filtering can be well reduced, and filtering is relatively easily implemented. In addition, although a bandwidth of the intermediate signal is relatively broad and a sampling rate is relatively high, because the intermediate signal is located in the middle, the intermediate signal does not have a high requirement on performance of the transition band, and the transition band may be very broad (for example, a left sideband and a right sideband may also be considered as one part of the transition band), a spectral mask with a relatively broad transition band may be used to perform filtering, and filtering is easily implemented. Therefore, considering the entire technical solution provided by the present application, the present application can well reduce filtering complexity during signal transmission.

Further, in a possible implementation of the first aspect, the method is further used to transmit M OFDM signals with contiguous frequencies that include the OFDM, where M is an integer greater than or equal to 2, and if parameters of the M OFDM signals are different from each other, the method further includes:

separately processing the M OFDM signals based on the preset filtering policy, to obtain M f-OFDM signals; and superposing the M f-OFDM signals and transmitting the superposed M f-OFDM signals.

It should be noted that bandwidths of all of the M OFDM signals may be the same or different.

However, when OFDM signals in the middle of a plurality of OFDM signals other than sideband signals on two sides are synchronized with each other and have a same OFDM parameter, these subbands only need to be filtered by using a spectral mask with a relatively broad transition band to reduce filtering complexity, so as to control a remote spectral leakage generated by these OFDM signals out of a bandwidth of the system instead of a spectral leakage of an adjacent band other than a current OFDM signal. Therefore, there may be a lower requirement on a transition band index of a filter of the plurality of OFDM signals in the middle that have the same parameter. However, for subbands located at two sides of a system bandwidth and subbands within the system bandwidth that use different OFDM parameters, a filter with an extremely narrow transition band needs to be used, to control a spectral leakage of an adjacent band other than these subbands. This can further reduce complexity of a filtering operation of the entire system. Specifically, if a first group of OFDM signals exist in the M OFDM signals, the first group of OFDM signals include i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and 2≤i≤M, in another possible implementation of the first aspect, the method further includes:

processing a first OFDM signal in the i OFDM signals based on the filtering policy, to obtain an f-OFDM signal corresponding to the first OFDM signal, where the first OFDM signal is located in a first edge of the i OFDM signals with contiguous frequencies;

processing a second OFDM signal in the i OFDM signals based on the filtering policy, to obtain an f-OFDM signal corresponding to the second OFDM signal, where the second OFDM signal is located in a second edge of the i OFDM signals with contiguous frequencies;

separately performing filtering processing of a fourth spectral mask on each of the i OFDM signals other than the first OFDM signal and the second OFDM signal, to obtain (i−2) f-OFDM signals, where a bandwidth of a transition band of the fourth spectral mask is greater than a second preset threshold;

separately processing the (M−i) OFDM signals based on the filtering policy, to obtain (M−i) f-OFDM signals; and superposing the f-OFDM signal corresponding to the first OFDM signal, the f-OFDM signal corresponding to the second OFDM signal, the (i−2) f-OFDM signals, and the (M−i) f-OFDM signals, and transmitting the superposed f-OFDM signals.

It may be understood that the foregoing process is mainly for transmission of a downlink signal. During communication, in a reverse process of the process of sending a downlink signal, a same transmitting device may also be used as a receiving device, to receive an uplink signal that is sent by a peer end after the foregoing processing. When receiving the uplink signal, processing performed by the receiving device on the uplink signal may be a reverse process of processing performed on a downlink signal, or there may be some differences.

Therefore, in a reverse process of the first aspect, in a second aspect, an embodiment of the present application further provides a signal processing method, used to process a received filtered-orthogonal frequency division multiplexing f-OFDM signal, where a transition band of the f-OFDM signal meets a first preset threshold, and the method may further includes:

processing the f-OFDM signal based on a preset signal processing policy, to obtain an OFDM signal, where the signal processing policy is:

performing digital frequency conversion processing, downsampling processing, and filtering processing of a first spectral mask on the received f-OFDM signal, to filter out a first sideband signal;

performing filtering processing of a second spectral mask on the received f-OFDM signal, to filter out a first signal;

performing digital frequency conversion processing, downsampling processing, and filtering processing of a third spectral mask on the received f-OFDM signal, to filter out a second sideband signal; and superposing the first sideband signal, the first signal, and the second sideband signal to obtain the OFDM signal corresponding to the received f-OFDM signal, where the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband, where a bandwidth of the first spectral mask and a bandwidth of the third spectral mask are both less than a bandwidth of the second spectral mask, and a transition band of the first spectral mask and a transition band of the third spectral mask are both less than a transition band of the second spectral mask.

According to a third aspect, an embodiment of the present application further provides a transmitter, where the transmitter is configured to transmit an orthogonal frequency division multiplexing OFDM signal, and the transmitter may include:

a first filter module, configured to filter the OFDM signal, to obtain an f-OFDM signal; and a sending module, configured to transmit the f-OFDM signal obtained by the first filter module, where the first filter module may specifically include: a signal division unit, a filter unit, and a combination unit, the signal division unit is configured to divide a to-be-transmitted OFDM signal into a first sideband signal, a first signal, and a second sideband signal, where the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal.

The left sideband and the right sideband may be two edge bands of an OFDM spectrum. The bandwidth of the first sideband signal and the bandwidth of the second sideband signal are both less than the bandwidth of the first signal. The bandwidth of the first sideband signal and the bandwidth of the second sideband signal may be the same. Specific values of signal bandwidths obtained through division may be arbitrary. This is not limited in this embodiment of the present application. Specifically, the bandwidth may be flexibly divided based on a processing capability of hardware, but in principle, values of the bandwidth of the first sideband signal and the bandwidth of the second sideband signal should be as small as possible (that is, the first sideband signal and the second sideband signal are narrowband signals), to ensure a relatively low sampling rate of the sideband signal. The first signal may be a broadband signal in a middle part.

Because it is specified in a communication protocol that one OFDM signal may include at least one subcarrier (as shown in FIG. 1), the following principle may be followed during signal division: subcarriers on the left of an OFDM signal are used as a first sideband signal, and subcarriers on the right of the OFDM signal are used as a second sideband signal, and remaining subcarriers are used as a first signal, the filter unit is configured to: sample, by using a first sampling rate, the first sideband signal obtained through division by the signal division unit, and perform filtering processing of a first spectral mask, upsampling processing, and digital frequency conversion processing on the sampled signal by using the first sampling rate to generate a first f-OFDM signal;

sample, by using a second sampling rate, the first signal obtained through division by the signal division unit, and perform filtering processing of a second spectral mask on the sampled signal by using the second sampling rate, to generate a second f-OFDM signal; and sample, by using a third sampling rate, the second sideband signal obtained through division by the signal division unit, and perform filtering processing of a third spectral mask, upsampling processing, and digital frequency conversion processing on the sampled signal by using the third sampling rate, to generate a third f-OFDM signal, the combination unit is configured to superpose the first f-OFDM signal, the second f-OFDM signal, and the third f-OFDM signal that are obtained through filtering by the filter unit, to obtain the f-OFDM signal.

It should be noted that a transition band of the first spectral mask and a transition band of the third spectral mask are both less than a transition band of the second spectral mask. The first spectral mask, the second spectral mask, and the third spectral mask are used to ensure that an out-of-band leakage of the filtered OFDM signal meets a first preset threshold. The first preset threshold may be set as needed. This is not limited in this embodiment of the present application. When a bandwidth of a transition band of a signal is less than the first preset threshold, it indicates that a transition band of a spectral mask used when the f-OFDM signal is obtained is relatively narrow. When a bandwidth of a transition band of a signal is greater than the first preset threshold, it indicates that a transition band of a spectral mask used when the f-OFDM signal is used is relatively broad.

A spectrum of the first f-OFDM signal has been moved to a spectral location that is in a spectrum of the OFDM signal and that corresponds to the first sideband signal, a spectrum of the second f-OFDM signal is at a spectral location that is in the spectrum of the OFDM signal and that corresponds to a spectrum of the first signal, and a third f-OFDM signal has been moved to a spectral location that is in the spectrum of the OFDM signal and that corresponds to the second sideband signal. Therefore, in terms of a frequency domain, the superposing the first f-OFDM signal, the second f-OFDM signal, and the third f-OFDM signal may be: superposing the spectrum of the first f-OFDM signal, the spectrum of the second f-OFDM signal, and a spectrum of the third f-OFDM signal, as a spectrum of a complete signal. Alternatively, in terms of a time domain, the superposing the first f-OFDM signal, the second f-OFDM signal, and the third f-OFDM signal may be: connecting the first f-OFDM signal, the second f-OFDM signal, and the third f-OFDM signal in chronological order, as a signal with consecutive time.

The first sampling rate and the third sampling rate are both less than the second sampling rate. A bandwidth of a transition band of the first f-OFDM signal and a bandwidth of a transition band of the third f-OFDM signal are both less than a preset threshold. A bandwidth of a transition band of the second f-OFDM signal is greater than the preset threshold.

Further, the transmitter is further configured to transmit M OFDM signals with contiguous frequencies that include the OFDM, where M is an integer greater than or equal to 2, and if parameters of the M OFDM signals are different from each other, in a possible implementation of the third aspect, the first filter module may be further configured to:

separately process the M OFDM signals, to obtain M f-OFDM signals; and the sending module is further configured to: superpose the M f-OFDM signals obtained by the first filter module, and transmit the superposed M f-OFDM signals.

It should be noted that bandwidths of all of the M OFDM signals may be the same or different.

However, when OFDM signals in the middle of a plurality of OFDM signals other than sideband signals on two sides are synchronized with each other and have a same OFDM parameter, these subbands only need to be filtered by using a spectral mask with a relatively broad transition band to reduce filtering complexity, so as to control a remote spectral leakage generated by these OFDM signals out of a bandwidth of the system instead of a spectral leakage of an adjacent band other than a current OFDM signal. Therefore, there may be a lower requirement on a transition band index of a filter of the plurality of OFDM signals in the middle that have the same parameter. However, for subbands located at two sides of a system bandwidth and subbands within the system bandwidth that use different OFDM parameters, a filter with an extremely narrow transition band needs to be used, to control a spectral leakage of an adjacent band other than these subbands. This can further reduce complexity of a filtering operation of the entire system. Specifically, if a first group of OFDM signals exist in the M OFDM signals, the first group of OFDM signals include i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and 2≤i≤M, in another possible implementation of the third aspect, the first filter module is further configured to:

filter a first OFDM signal in the i OFDM signals, to obtain an f-OFDM signal corresponding to the first OFDM signal, where the first OFDM signal is located in a first edge of the i OFDM signals with contiguous frequencies;

filter a second OFDM signal in the i OFDM signals, to obtain an f-OFDM signal corresponding to the second OFDM signal, where the second OFDM signal is located in a second edge of the i OFDM signals with contiguous frequencies; and separately filter the (M−i) OFDM signals, to obtain (M−i) f-OFDM signals;

the transmitter further includes a second filter module, where the second filter module is configured to separately perform filtering processing of a fourth spectral mask on each of the i OFDM signals other than the first OFDM signal and the second OFDM signal, to obtain (i−2) f-OFDM signals, where a bandwidth of a transition band of the fourth spectral mask is greater than a second preset threshold; and the sending module is further configured to: superpose the f-OFDM signal corresponding to the first OFDM signal, the f-OFDM signal corresponding to the second OFDM signal, the (i−2) f-OFDM signals, and the (M−i) f-OFDM signals, and transmit the superposed f-OFDM signals.

It may be understood that the foregoing process is mainly for transmission of a downlink signal. During communication, in a reverse process of the process of sending a downlink signal, a same transmitting device may also be used as a receiving device, to receive an uplink signal that is sent by a peer end after the foregoing processing. When receiving the uplink signal, processing performed by the receiving device on the uplink signal may be a reverse process of processing performed on a downlink signal, or there may be some differences.

Therefore, on a receive end relative to a transmitter, in a fourth aspect, an embodiment of the present application further provides a receiver, where the receiver is configured to process a received filtered-orthogonal frequency division multiplexing f-OFDM signal, where a transition band of the f-OFDM signal meets a first preset threshold, and the receiver may further include:

a receiving module, configured to receive the f-OFDM signal; and a first processing module, configured to process, based on a preset signal processing policy, the f-OFDM signal received by the receiving module, to obtain an OFDM signal, where the signal processing policy is:

performing digital frequency conversion processing, downsampling processing, and filtering processing of a first spectral mask on the received f-OFDM signal, to filter out a first sideband signal;

performing filtering processing of a second spectral mask on the received f-OFDM signal, to filter out a first signal;

performing digital frequency conversion processing, downsampling processing, and filtering processing of a third spectral mask on the received f-OFDM signal, to filter out a second sideband signal; and superposing the first sideband signal, the first signal, and the second sideband signal to obtain the OFDM signal corresponding to the received f-OFDM signal, where the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband, where a bandwidth of the first spectral mask and a bandwidth of the third spectral mask are both less than a bandwidth of the second spectral mask, and a transition band of the first spectral mask and a transition band of the third spectral mask are both less than a transition band of the second spectral mask.

According to a fifth aspect, an embodiment of the present application further provides a transmitter, where the transmitter is configured to transmit an orthogonal frequency division multiplexing OFDM signal, and the transmitter may include:

a processor, configured to process the OFDM signal based on a preset filtering policy, to obtain an f-OFDM signal; and a communications unit, configured to transmit the f-OFDM signal obtained by the processor, where the filtering policy is specifically:

dividing a to-be-transmitted OFDM signal into a first sideband signal, a first signal, and a second sideband signal, where the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal;

sampling, by using a third sampling rate, the first sideband signal obtained through division by the signal division unit, and performing filtering processing of a first spectral mask, upsampling processing, and digital frequency conversion processing on the sampled signal by using the first sampling rate, to generate a first f-OFDM signal;

sampling, by using a second sampling rate, the first signal obtained through division by the signal division unit, and performing filtering processing of a second spectral mask on the sampled signal by using the second sampling rate, to generate a second f-OFDM signal;

sampling, by using a third sampling rate, the second sideband signal obtained through division by the signal division unit, and performing filtering processing of a third spectral mask, upsampling processing, and digital frequency conversion processing on the sampled signal by using the third sampling rate, to generate a third f-OFDM signal; and superposing the first f-OFDM signal, the second f-OFDM signal, and the third f-OFDM signal to obtain the f-OFDM signal.

The left sideband and the right sideband may be two edge bands of an OFDM spectrum. The bandwidth of the first sideband signal and the bandwidth of the second sideband signal are both less than the bandwidth of the first signal. The bandwidth of the first sideband signal and the bandwidth of the second sideband signal may be the same. Specific values of signal bandwidths obtained through division may be arbitrary. This is not limited in this embodiment of the present application. Specifically, the bandwidth may be flexibly divided based on a processing capability of hardware, but in principle, values of the bandwidth of the first sideband signal and the bandwidth of the second sideband signal should be as small as possible (that is, the first sideband signal and the second sideband signal are narrowband signals), to ensure a relatively low sampling rate of the sideband signal. The first signal may be a broadband signal in a middle part.

Because it is specified in a communication protocol that one OFDM signal may include at least one subcarrier (as shown in FIG. 1), the following principle may be followed during signal division: subcarriers on the left of an OFDM signal are used as a first sideband signal, and subcarriers on the right of the OFDM signal are used as a second sideband signal, and remaining subcarriers are used as a first signal.

A spectrum of the first f-OFDM signal has been moved to a spectral location that is in a spectrum of the OFDM signal and that corresponds to the first sideband signal, a spectrum of the second f-OFDM signal is at a spectral location that is in the spectrum of the OFDM signal and that corresponds to a spectrum of the first signal, and a third f-OFDM signal has been moved to a spectral location that is in the spectrum of the OFDM signal and that corresponds to the second sideband signal. Therefore, in terms of a frequency domain, the superposing the first f-OFDM signal, the second f-OFDM signal, and the third f-OFDM signal may be: superposing the spectrum of the first f-OFDM signal, the spectrum of the second f-OFDM signal, and a spectrum of the third f-OFDM signal, as a spectrum of a complete signal. Alternatively, in terms of a time domain, the superposing the first f-OFDM signal, the second f-OFDM signal, and the third f-OFDM signal may be: connecting the first f-OFDM signal, the second f-OFDM signal, and the third f-OFDM signal in chronological order, as a signal with consecutive time.

The first sampling rate and the third sampling rate are both less than the second sampling rate; a transition band of the first spectral mask and a transition band of the third spectral mask are both less than a transition band of the second spectral mask; and the first spectral mask, the second spectral mask, and the third spectral mask are used to: ensure that an out-of-band leakage of the filtered OFDM signal meets a first preset threshold. The first preset threshold may be set as needed. This is not limited in this embodiment of the present application. When a bandwidth of a transition band of a signal is less than the first preset threshold, it indicates that a transition band of a spectral mask used when the f-OFDM signal is obtained is relatively narrow. When a bandwidth of a transition band of a signal is greater than the first preset threshold, it indicates that a transition band of a spectral mask used when the f-OFDM signal is used is relatively broad.

Further, the transmitter is further configured to transmit M OFDM signals with contiguous frequencies that include the OFDM, where M is an integer greater than or equal to 2, and if parameters of the M OFDM signals are different from each other, in a possible implementation of the fifth aspect, the processor may be further configured to:

separately process the M OFDM signals based on the filtering policy, to obtain M f-OFDM signals; and the transmitter is further configured to: superpose the M f-OFDM signals obtained by the processor, and transmit the superposed f-OFDM signals.

It should be noted that bandwidths of all of the M OFDM signals may be the same or different.

However, when OFDM signals in the middle of a plurality of OFDM signals other than sideband signals on two sides are synchronized with each other and have a same OFDM parameter, these subbands only need to be filtered by using a spectral mask with a relatively broad transition band to reduce filtering complexity, so as to control a remote spectral leakage generated by these OFDM signals out of a bandwidth of the system instead of a spectral leakage of an adjacent band other than a current OFDM signal. Therefore, there may be a lower requirement on a transition band index of a filter of the plurality of OFDM signals in the middle that have the same parameter. However, for subbands located at two sides of a system bandwidth and subbands within the system bandwidth that use different OFDM parameters, a filter with an extremely narrow transition band needs to be used, to control a spectral leakage of an adjacent band other than these subbands. This can further reduce complexity of a filtering operation of the entire system. Specifically, if a first group of OFDM signals exist in the M OFDM signals, the first group of OFDM signals include i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and 2≤i≤M, in another possible implementation of the fifth aspect, the processor is further configured to:

process a first OFDM signal in the i OFDM signals based on the filtering policy, to obtain an f-OFDM signal corresponding to the first OFDM signal, where the first OFDM signal is located in a first edge of the i OFDM signals with contiguous frequencies;

process a second OFDM signal in the i OFDM signals based on the filtering policy, to obtain an f-OFDM signal corresponding to the second OFDM signal, where the second OFDM signal is located in a second edge of the i OFDM signals with contiguous frequencies;

separately perform filtering processing of a fourth spectral mask on each of the i OFDM signals other than the first OFDM signal and the second OFDM signal, to obtain (i−2) f-OFDM signals, where a bandwidth of a transition band of the fourth spectral mask is greater than a second preset threshold; and separately process the (M−i) OFDM signals based on the filtering policy, to obtain (M−i) f-OFDM signals.

The transmitter is further configured to: superpose the f-OFDM signal corresponding to the first OFDM signal, the f-OFDM signal corresponding to the second OFDM signal, the (i−2) f-OFDM signals, and the (M−i) f-OFDM signals, and transmit the superposed f-ofdm.

It may be understood that the foregoing process is mainly for transmission of a downlink signal. During communication, in a reverse process of the process of sending a downlink signal, a same transmitting device may also be used as a receiving device, to receive an uplink signal that is sent by a peer end after the foregoing processing. When receiving the uplink signal, processing performed by the receiving device on the uplink signal may be a reverse process of processing performed on a downlink signal, or there may be some differences.

Therefore, on a receive end relative to a transmitter, in a sixth aspect, an embodiment of the present application further provides a receiver, where the receiver is configured to process a received filtered-orthogonal frequency division multiplexing f-OFDM signal, where a transition band of the f-OFDM signal meets a first preset threshold, and the receiver may further include:

a communications unit, configured to receive the f-OFDM signal; and a processor, configured to process, based on a preset signal processing policy, the f-OFDM signal received by the communications unit, to obtain an OFDM signal, where the signal processing policy is:

performing digital frequency conversion processing, downsampling processing, and filtering processing of a first spectral mask on the received f-OFDM signal, to filter out a first sideband signal;

performing filtering processing of a second spectral mask on the received f-OFDM signal, to filter out a first signal;

performing digital frequency conversion processing, downsampling processing, and filtering processing of a third spectral mask on the received f-OFDM signal, to filter out a second sideband signal; and superposing the first sideband signal, the first signal, and the second sideband signal to obtain the OFDM signal corresponding to the received f-OFDM signal, where the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband, where a bandwidth of the first spectral mask and a bandwidth of the third spectral mask are both less than a bandwidth of the second spectral mask, and a transition band of the first spectral mask and a transition band of the third spectral mask are both less than a transition band of the second spectral mask.

It can be learned from the foregoing that the embodiments of the present application provide the signal processing method and the device. The to-be-transmitted OFDM signal is divided into the first sideband signal, the first signal, and the second sideband signal. The first sideband signal is located in the left sideband of the to-be-transmitted OFDM signal, the second sideband signal is located in the right sideband of the to-be-transmitted OFDM signal, and the first signal is located in the intermediate frequency band in the to-be-transmitted OFDM signal other than the left sideband and the right sideband. The bandwidth of the first sideband signal and the bandwidth of the second sideband signal are both less than the bandwidth of the first signal. The first sideband signal is sampled by using the first sampling rate, and filtering processing of the first spectral mask, upsampling processing, and digital frequency conversion processing are performed on the sampled signal, to generate the first f-OFDM signal. The first signal is sampled by using the second sampling rate, and filtering processing of the second spectral mask is performed on the sampled signal, to generate the second f-OFDM signal. The second sideband signal is sampled by using the third sampling rate, and filtering processing of the third spectral mask, upsampling processing, and digital frequency conversion processing are performed on the sampled signal, to generate the third f-OFDM signal. The first f-OFDM signal, the second f-OFDM signal, and the third f-OFDM signal are superposed to obtain the f-OFDM signal, and the f-OFDM signal is transmitted. The first sampling rate and the third sampling rate are both less than the second sampling rate. The bandwidth of the transition band of the first f-OFDM signal and the bandwidth of the transition band of the third f-OFDM signal are both less than the preset threshold. The bandwidth of the transition band of the second f-OFDM signal is greater than the preset threshold. In this way, compared with the prior art, in the present application, an OFDM broadband signal is divided into two sideband signals and one intermediate signal. Filtering processing of a spectral mask with a relatively narrow transition band is performed on the two sideband signals. Filtering processing of a spectral mask with a relatively broad transition band is performed on the intermediate signal. The sideband signal is at an edge location. Therefore, even though filtering needs to be performed by means of shaping filtering, to obtain a very narrow transition band and achieve excellent out-of-band performance, because a bandwidth of a sideband is relatively narrow and a sampling rate is low, a work sampling rate of digital shaping filtering can be well reduced, and filtering is easily implemented. In addition, although a bandwidth of the intermediate signal is relatively broad and a sampling rate is relatively high, because the intermediate signal is located in the middle, the intermediate signal does not have a high requirement on performance of the transition band, and the transition band may be very broad, filtering may be performed by means of shaping filtering with a very low order, and filtering is easily implemented. Therefore, considering the entire technical solution provided by the present application, filtering complexity can be well reduced.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DESCRIPTION OF EMBODIMENTS

Figure 2:
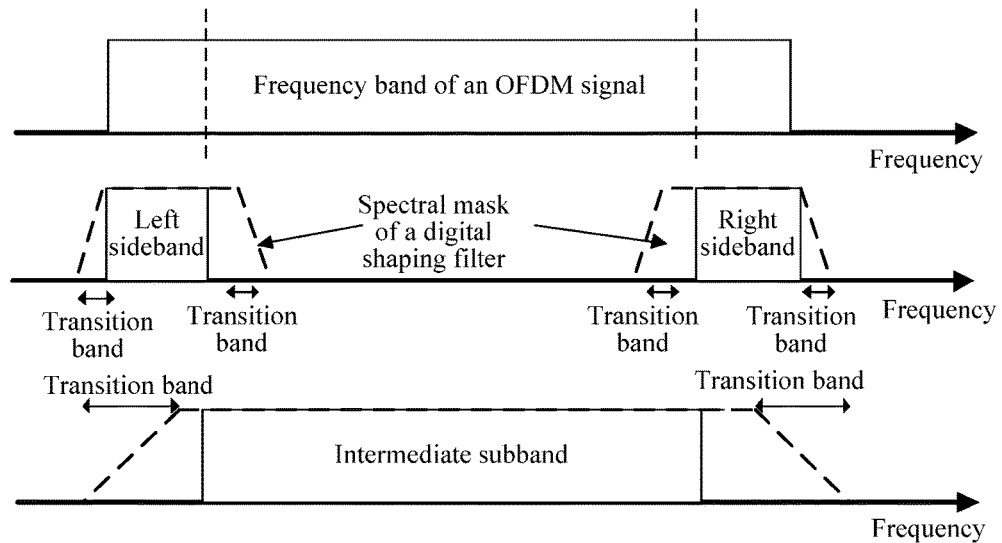
FIG. 2 is a schematic diagram of frequency-domain signal division according to an embodiment of the present application.

As described above, complexity of digital shaping filtering in the existing f-OFDM waveform technology is mainly caused by results of two aspects: 1. To obtain favorable out-of-band performance, an order of digital shaping filtering is very high. 2. A bandwidth of a signal is relatively broad, so that a working sampling rate of filtering is very high. In this case, if the two aspects can be decoupled while favorable out-of-band performance can be achieved, that is, high-order filtering is performed at a low sampling rate and low-order filtering is performed at a high sampling rate, filtering complexity can be greatly reduced. Based on this idea, as shown in FIG. 2, in the present application, an OFDM broadband signal is divided into three subband signals in a frequency domain: a left sideband signal, an intermediate subband signal, and a right sideband signal. It can be learned from FIG. 2 that the left sideband signal and the right sideband signal are at edge locations, and need to be filtered by means of high-order shaping filtering, to obtain a very narrow transition band, and achieve favorable out-of-band performance. However, a bandwidth of a left sideband and a bandwidth of a right sideband are relatively narrow, and sampling rates are low. This can well reduce a working sampling rate of the high-order digital shaping filtering, and filtering is easily implemented. In addition, although a bandwidth of an intermediate subband is relatively broad and a sampling rate is relatively high, because the intermediate subband is at a middle location, a transition band of the intermediate subband may be very broad (for example, the left and right sidebands may also be considered as one part of the transition band), and filtering may be performed by means of shaping filtering with a very low order. Therefore, the filtering is very easily implemented.

The following clearly describes the technical solutions in the embodiments of the present application with reference to the accompanying drawings in the embodiments of the present application. Apparently, the described embodiments are merely some but not all of the embodiments of the present application. All other embodiments derived by a person of ordinary skill from the embodiments of the present application without creative efforts shall fall within the protection scope of the present application.

Figure 3:
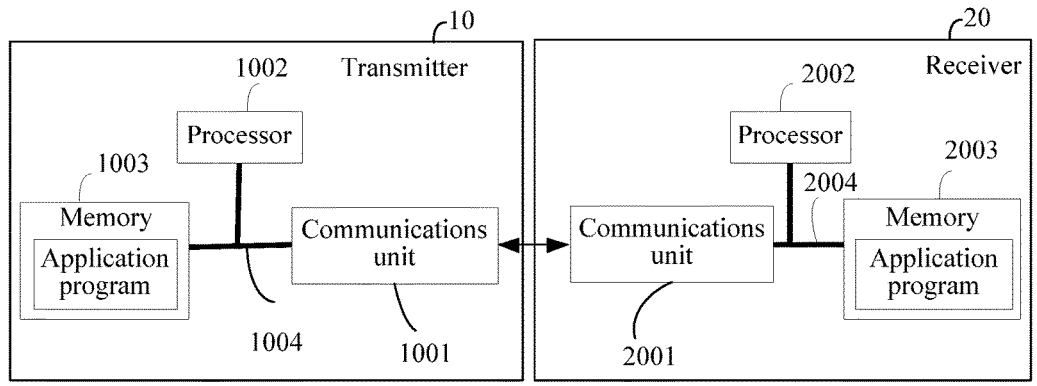
FIG. 3 is a block diagram of a transceiver system according to an embodiment of the present application.

FIG. 3 is a block diagram of a transceiver system according to an embodiment of the present application. As shown in FIG. 3, the transceiver system may include a transmitter 10 and a receiver 20. The transmitter 10 is configured to filter a to-be-transmitted OFDM signal by using a filtering policy provided in the present application, to obtain f-OFDM, and transmit the f-OFDM. The receiver 20 is configured to: receive the f-OFDM signal transmitted by the transmitter 10, and process the received f-OFDM signal by using a process reverse of that of the transmitter 10, to obtain the original OFDM signal by means of restoration.

Specifically, as shown in FIG. 3, the transmitter 10 may include a communications unit 1001, a processor 1002, a memory 1003, and at least one communications bus 1004, and is configured to implement connection and communication between these apparatuses. The receiver 20 may include a communications unit 2001, a processor 2002, a memory 2003, and at least one communications bus 2004, and is configured to implement connection and communication between these apparatuses.

The communications unit 1001 and the communications unit 2001 may be configured to perform signal transmission with an external network element, and each may be an antenna unit.

The processor 1002 and the processor 2002 each may be a central processing unit (CPU), or may be an application-specific integrated circuit (ASIC), or may be configured into one or more integrated circuits for implementing this embodiment of the present application, such as one or more microprocessors (digital signal processor, DSP), or one or more field programmable gate arrays (FPGA).

The memory 1003 and the memory 2003 each may be a volatile memory (volatile memory), for example, a random access memory (RAM), or a non-volatile memory, for example, a read-only memory (ROM), a flash memory, a hard disk drive (HDD), or a solid-state drive (SSD), or a combination of the foregoing types of memories.

The communications bus 1004 and the communications bus 2004 each may be an address bus, a data bus, a control bus, or the like, may be an industry standard architecture (ISA) bus, a peripheral component interconnect (PCI) bus, an extended industry standard architecture (EISA) bus, or the like. For ease of representation, the communications bus is represented by using only one bold line in FIG. 3, but it does not indicate that there is only one bus or only one type of bus.

Specifically, when the transmitter 10 is to transmit an orthogonal frequency division multiplexing OFDM signal, the processor 1002 in the transmitter 10 is configured to: divide the to-be-transmitted OFDM signal into a first sideband signal, a first signal, and a second sideband signal, where the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal;

sample, by using a first sampling rate, the first sideband signal obtained through division by the processor, and perform filtering processing of a first spectral mask, upsampling processing, and digital frequency conversion processing on a sampled signal, to generate a first f-OFDM signal;

sample, by using a second sampling rate, the first signal obtained through division by the processor, and perform filtering processing of a second spectral mask on a sampled signal, to generate a second f-OFDM signal; and sample, by using a third sampling rate, the second sideband signal obtained through division by the processor, and perform filtering processing of a third spectral mask, upsampling processing, and digital frequency conversion processing on a sampled signal, to generate a third f-OFDM signal.

The first sampling rate and the third sampling rate are both less than the second sampling rate; a transition band of the first spectral mask and a transition band of the third spectral mask are both less than a transition band of the second spectral mask; and the first spectral mask, the second spectral mask, and the third spectral mask are used to: ensure that an out-of-band leakage of the filtered OFDM signal meets a first preset threshold.

The transmitter 10 is configured to superpose the first f-OFDM signal, the second f-OFDM signal, and the third f-OFDM signal that are obtained through filtering by the processor 1002, to obtain the f-OFDM signal.

The first sampling rate and the third sampling rate are both less than the second sampling rate. A bandwidth of a transition band of the first f-OFDM signal and a bandwidth of a transition band of the third f-OFDM signal are both less than a preset threshold. A bandwidth of a transition band of the second f-OFDM signal is greater than the preset threshold.

Further, the transmitter 10 is further configured to transmit M OFDM signals with contiguous frequencies that include the OFDM, where M is an integer greater than or equal to 2, and if parameters of the M OFDM signals are different from each other, the processor 1002 may be further configured to:

separately process the M OFDM signals based on the filtering policy, to obtain M f-OFDM signals; and the transmitter is further configured to: superpose the M f-OFDM signals obtained by the processor, and transmit the superposed M f-OFDM signals.

It should be noted that bandwidths of all of the M OFDM signals may be the same or different.

However, when OFDM signals in the middle of a plurality of OFDM signals other than sideband signals on two sides are synchronized with each other and have a same OFDM parameter, these subbands only need to be filtered by using a spectral mask with a relatively broad transition band to reduce filtering complexity, so as to control a remote spectral leakage generated by these OFDM signals out of a bandwidth of the system instead of a spectral leakage of an adjacent band other than a current OFDM signal. Therefore, there may be a lower requirement on a transition band index of a filter of the plurality of OFDM signals in the middle that have the same parameter. However, for subbands located at two sides of a system bandwidth and subbands within the system bandwidth that use different OFDM parameters, a filter with an extremely narrow transition band needs to be used, to control a spectral leakage of an adjacent band other than these subbands. This can further reduce complexity of a filtering operation of the entire system. Specifically, if a first group of OFDM signals exist in the M OFDM signals, the first group of OFDM signals include i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and 2≤i≤M, the processor 1002 may be further configured to:

process a first OFDM signal in the i OFDM signals based on the filtering policy, to obtain an f-OFDM signal corresponding to the first OFDM signal, where the first OFDM signal is located in a first edge of the i OFDM signals with contiguous frequencies;

process a second OFDM signal in the i OFDM signals based on the filtering policy, to obtain an f-OFDM signal corresponding to the second OFDM signal, where the second OFDM signal is located in a second edge of the i OFDM signals with contiguous frequencies;

separately perform filtering processing of a fourth spectral mask on each of the i OFDM signals other than the first OFDM signal and the second OFDM signal, to obtain (i−2) f-OFDM signals, where a bandwidth of a transition band of the fourth spectral mask is greater than a second preset threshold; and separately process the (M−i) OFDM signals based on the filtering policy, to obtain (M−i) f-OFDM signals.

The transmitter is further configured to: superpose the f-OFDM signal corresponding to the first OFDM signal, the f-OFDM signal corresponding to the second OFDM signal, the (i−2) f-OFDM signals, and the (M−i) f-OFDM signals, and transmit superposed f-OFDMs.

In this way, compared with the prior art, in the present application, an OFDM broadband signal is divided into two sideband signals and one intermediate signal. Filtering processing of a spectral mask with a relatively narrow transition band is performed on the two sideband signals. Filtering processing of a spectral mask with a relatively broad transition band is performed on the intermediate signal. The sideband signal is at an edge location. Therefore, even though the spectral mask with a relatively narrow transition band needs to be used to perform filtering, to achieve excellent out-of-band performance, because a bandwidth of a sideband is relatively narrow and a sampling rate is low, a work sampling rate of digital shaping filtering can be well reduced, and filtering implementation is relatively simple. In addition, although a bandwidth of the intermediate signal is relatively broad and a sampling rate is relatively high, because the intermediate signal is located in the middle, the intermediate signal does not have a high requirement on performance of the transition band, and the transition band may be very broad (for example, a left sideband and a right sideband may also be considered as one part of the transition band), a spectral mask with a relatively broad transition band may be used to perform filtering, and filtering is easily implemented. Therefore, considering the entire technical solution provided by the present application, the present application can well reduce filtering complexity during signal transmission.

Relatively, in a reverse process of the process of sending a signal, after the communications unit 2001 in the receiver 20 receives the f-OFDM signal, the processor 2002 in the receiver 20 is configured to:

perform digital frequency conversion processing, downsampling processing, and filtering processing of a first spectral mask on the received f-OFDM signal, to filter out a first sideband signal;

perform filtering processing of a second spectral mask on the received f-OFDM signal, to filter out a first signal;

perform digital frequency conversion processing, downsampling processing, and filtering processing of a third spectral mask on the received f-OFDM signal, to filter out a second sideband signal; and superpose the first sideband signal, the first signal, and the second sideband signal to obtain an OFDM signal corresponding to the received f-OFDM signal, where the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband, where a bandwidth of the first spectral mask and a bandwidth of the third spectral mask are both less than a bandwidth of the second spectral mask, and a transition band of the first spectral mask and a transition band of the third spectral mask are both less than a transition band of the second spectral mask.

It should be noted that the foregoing transmitter 10 and receiver 20 may be independent devices sending and receiving signals to each other. For example, one may be a base station, and the other may be a terminal. Alternatively, the transmitter 10 and the receiver 20 may be considered as a same device that has functions of both sending a signal and receiving a signal.

For ease of description, the signal processing method provided in the present application is shown in a form of steps and described in detail in Embodiment 1 below. The shown steps may be performed in, for example, a computer system of a set of executable instructions other than the transmitter 10 and the receiver 20. In addition, although a logical order is shown in the figure, in some cases, the shown or described steps may be performed in an order different from the order herein.

Embodiment 1

Figure 4:
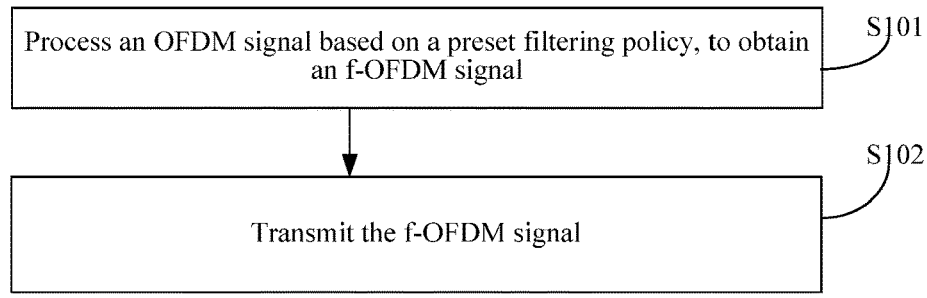
FIG. 4 is a flowchart of a signal processing method according to an embodiment of the present application.

FIG. 4 shows a signal processing method according to an embodiment of the present application. The method is performed by the transmitter 10 described in FIG. 3, and is used to transmit an orthogonal frequency division multiplexing OFDM signal. As shown in FIG. 4, the method may include the following steps.

S101: Process the OFDM signal based on a preset filtering policy, to obtain an f-OFDM signal.

S102: Transmit the f-OFDM signal.

Figure 5:
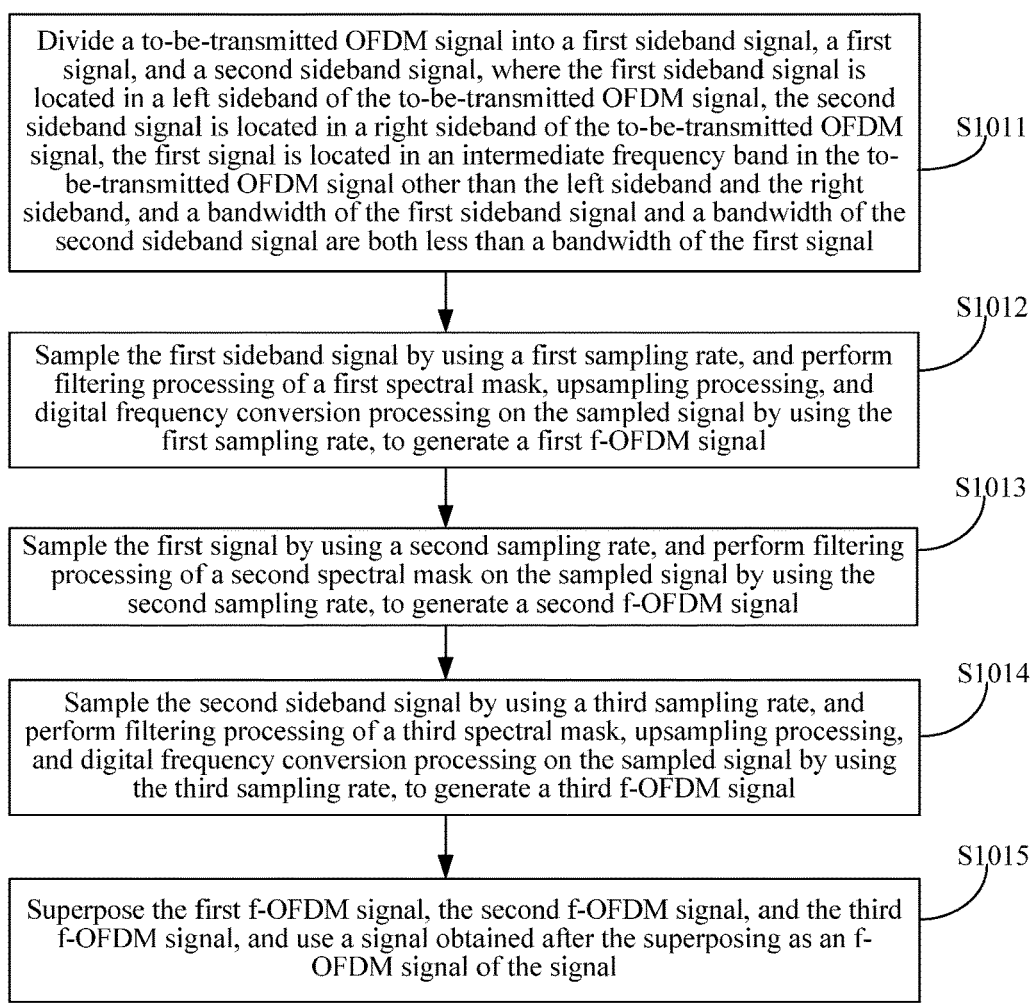
FIG. 5 is a flowchart of a signal processing method according to an embodiment of the present application.

The filtering policy is a technical solution, provided in this embodiment of the present application, for reducing filtering complexity based on the foregoing principle. Transition bands at two sides of a signal processed based on the filtering policy are relatively narrow, and out-of-band performance is favorable. Specifically, for a to-be-transmitted OFDM signal, a process in which the OFDM signal is processed based on a preset filtering policy, to obtain an f-OFDM signal is shown in FIG. 5, and may include the following steps.

S1011: Divide a to-be-transmitted OFDM signal into a first sideband signal, a first signal, and a second sideband signal, where the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal.

Figure 1:
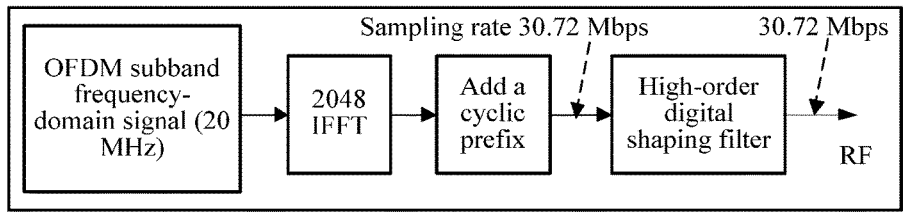
FIG. 1 is a schematic diagram of processing an OFDM subband frequency-domain signal in the prior art.

The left sideband and the right sideband may be two edge bands of an OFDM spectrum. For example, as shown in FIG. 1, the left sideband may be a frequency band in a left edge of the spectrum, and the right sideband may be a frequency band in a right edge of the spectrum. It may be understood that in this embodiment of the present application, a location or a location relationship indicated based on a term "left" or "right" is a location or a location relationship shown based on the accompanying drawing, merely for convenience of describing the present application and for brevity of description, but not for indicating or implicitly indicating that a described object needs to have a particular location or be constructed or operated at a particular location. Therefore, the location or the location relationship cannot be construed as a limitation to the present application.

The bandwidth of the first sideband signal and the bandwidth of the second sideband signal are both less than the bandwidth of the first signal. The bandwidth of the first sideband signal and the bandwidth of the second sideband signal may be the same. Specific values of signal bandwidths obtained through division may be arbitrary. This is not limited in this embodiment of the present application. Specifically, the bandwidth may be flexibly divided based on a processing capability of hardware, but in principle, values of the bandwidth of the first sideband signal and the bandwidth of the second sideband signal should be as small as possible (that is, the first sideband signal and the second sideband signal are narrowband signals), to ensure a relatively low sampling rate of the sideband signal. The first signal may be a broadband signal in a middle part.

Because it is specified in a communication protocol that one OFDM signal may include at least one subcarrier (as shown in FIG. 1), the following principle may be followed during signal division: subcarriers on the left of an OFDM signal are used as a first sideband signal, and subcarriers on the right of the OFDM signal are used as a second sideband signal, and remaining subcarriers are used as a first signal.

S1012: Sample the first sideband signal by using a first sampling rate, and perform filtering processing of a first spectral mask, upsampling processing, and digital frequency conversion processing on the sampled signal by using the first sample rate, to generate a first f-OFDM signal.

Because the to-be-transmitted OFDM signal described in this embodiment of the present application is a baseband frequency-domain signal, sampling of the first sideband signal by using the first sampling rate may be implemented by using an IFFT technology. The first sampling rate may be a single sampling rate of the first sideband signal. The single sampling rate is a bandwidth of $2^n$ subcarriers, where $2^n$ is closest to a quantity of subcarriers included in the first sideband signal, and n is an integer greater than or equal to 1. For example, if a bandwidth of the first sideband signal is 900 kHz, and a bandwidth of each subcarrier is 15 kHz, the first sideband signal includes 60 subcarriers, $2^n$ closest to 60 is 128, and the first sampling rate is: 128*15=1920 kbps=1.92 Mbps.

The filtering processing of the spectral mask described in this embodiment of the present application is time domain filtering, and the time domain filtering is to perform a linear convolution operation on the time-domain signal. For example, assuming that a time domain response to the filtering is f(n) n=0, 1, . . . M−1 (M is a filtering order), and a time domain input signal is x(n), a filtered output signal is:

$$y[n] = \sum_{m=0}^{M-1} x[n-m]f[m].$$

That is, M times of complex multiplication and M−1 times of complex addition are needed for each input time domain sampling point, and a filtering signal corresponding to the sampling point can be obtained only in this way.

A transition band of the first spectral mask is relatively narrow, to ensure that a filtered signal has a very narrow transition band, to achieve favorable out-of-band performance. Because a higher filtering order of a spectral mask indicates a narrower transition band of a filtered signal, correspondingly, the first spectral mask may be a digital shaping filtering mask with a relatively high filtering order.

According to two implementations of digital filtering: a time domain implementation and a frequency domain implementation, the filtering processing of the spectral mask may further be set to frequency domain filtering, to filter a frequency-domain signal. This is not limited in this embodiment of the present application. In this embodiment of the present application, description is provided only by using an example in which the filtering processing of the spectral mask is time domain filtering.

The upsampling means: sampling a signal that is filtered by using the first spectral mask, so that a sampling rate of a sampled signal is greater than a sampling rate of the filtered signal, and a finally obtained single sampling rate of the first f-OFDM signal is the same as a single sampling rate of an original OFDM signal.

The digital frequency conversion means: performing spectrum movement on a signal on which up-sampling has been performed, to move the signal to a spectral location of the first sideband signal.

It should be noted that after the first sideband signal is sampled by using the first sampling rate, the first sideband signal changes to a signal that is discrete in time. In this case, to prevent interference between signals, a cyclic prefix may be further added (Add CP) to the sampled signal, and filtering processing of the first spectral mask, upsampling processing, and up-conversion processing are performed on the sampled signal to which the cyclic prefix has been added, to generate the first f-OFDM signal.

S1013: Sample the first signal by using a second sampling rate, and perform filtering processing of a second spectral mask on the sampled signal by using the second sample rate, to generate a second f-OFDM signal.

Sampling of the first signal by using the second sampling rate may be implemented by using an IFFT technology. Because the first signal is an intermediate signal of the original OFDM signal, and a bandwidth of the first signal is relatively close to a bandwidth of the original OFDM signal, the second sampling rate basically may be a single sampling rate of the OFDM signal, so that a single sampling rate of the second f-OFDM signal generated after the sampling and filtering is the same as the single sampling rate of the original OFDM signal. In addition, the bandwidth of the first sideband signal and the bandwidth of the second sideband signal are both greatly less than the bandwidth of the first signal. Therefore, a single sampling rate of the first sideband signal and a single sampling rate of the second sideband signal are both greatly less than a single sampling rate of the first signal when the single sampling rate of the first signal is used as the sampling rate. Therefore, when a single sampling rate of a signal is used as a sampling rate to perform sampling, the second sampling rate is greater than the first sampling rate and the third sampling rate in step S1014.

Because the first signal is an intermediate signal of the original OFDM signal and may have a relatively broad transition band (for example, a frequency band of the first sideband signal and a frequency band of the second sideband signal may be used as transition bands of the first signal), when the filtering processing of the second spectral mask is performed on the first signal, a spectral mask whose transition band is relatively broad may be used for filtering. That is, a filtering order of the second spectral mask may be set relatively small, to reduce filtering complexity. Optionally, in this embodiment of the present application, a transition band of the second spectral mask may be set greater than a transition band of the first spectral mask and a transition band of a third spectral mask.

It should be noted that after the first signal is sampled by using the second sampling rate, the first signal changes to a signal that is discrete in time. In this case, to prevent interference between signals, a cyclic prefix may be added (Add CP) to the sampled signal, and filtering processing of the second spectral mask is performed on the signal to which the cyclic prefix has been added, to generate the second f-OFDM signal.

S1014: Sample the second sideband signal by using a third sampling rate, and perform filtering processing of a third spectral mask, upsampling processing, and digital frequency conversion processing on the sampled signal by using the third sample rate, to generate a third f-OFDM signal.

Sampling of the second sideband signal by using the third sampling rate may be implemented by using an IFFT technology. The third sampling rate may be a single sampling rate of the second sideband signal. The single sampling rate is a bandwidth of $2^n$ subcarriers, where $2^n$ is closest to a quantity of subcarriers included in the second sideband signal, and n is an integer greater than or equal to 1.

Same as the first spectral mask, the third spectral mask also has a relatively narrow transition band, to ensure that a signal on which filtering of the third spectral mask has been performed has a very narrow transition band, to achieve favorable out-of-band performance. Because a higher filtering order of a spectral mask indicates a narrower transition band of a filtered signal, correspondingly, the third spectral mask may be a digital shaping filtering mask with a relatively high filtering order.

The upsampling means: sampling a signal that is filtered by using the third spectral mask, so that a sampling rate of a sampled signal is greater than a sampling rate of the filtered signal.

The digital frequency conversion means: performing spectrum movement on a signal on which up-sampling has been performed, to move the signal to a spectral location of the second sideband signal.

It should be noted that after the second sideband signal is sampled by using the third sampling rate, the second sideband signal changes to a signal that is discrete in time. In this case, to prevent interference between signals, a cyclic prefix may be further added (Add CP) to the sampled signal, and filtering processing of the third spectral mask, upsampling processing, and up-conversion processing are performed on the sampled signal to which the cyclic prefix has been added, to generate the third f-OFDM signal.

In addition, regardless of settings of transitions of the first spectral mask, the second spectral mask, and the third spectral mask, it needs to be ensured that an out-of-band leakage of the OFDM signal on which filtering of the first spectral mask, filtering of the second spectral mask, and filtering of the third spectral mask have been performed meets the first preset threshold. The first preset threshold may be set as required. This is not limited in this embodiment of the present application. When the out-of-band leakage of the OFDM signal meets the first preset threshold, it indicates that the signal has favorable out-of-band performance, and does not interfere with another signal. When the out-of-band leakage of the OFDM signal does not meet the first preset threshold, it indicates that the out-of-band leakage of the signal is relatively great, seriously affecting another signal.

S1015: Superpose the first f-OFDM signal, the second f-OFDM signal, and the third f-OFDM signal, and use the superposed f-OFDM signals as the f-OFDM signal of the signal.

A spectrum of the first f-OFDM signal has been moved to a spectral location that is in a spectrum of the OFDM signal and that corresponds to the first sideband signal, a spectrum of the second f-OFDM signal is at a spectral location that is in the spectrum of the OFDM signal and that corresponds to a spectrum of the first signal, and a third f-OFDM signal has been moved to a spectral location that is in the spectrum of the OFDM signal and that corresponds to the second sideband signal. Therefore, in terms of a frequency domain, the superposing the first f-OFDM signal, the second f-OFDM signal, and the third f-OFDM signal may be: superposing the spectrum of the first f-OFDM signal, the spectrum of the second f-OFDM signal, and a spectrum of the third f-OFDM signal, as a spectrum of a complete signal. Alternatively, in terms of a time domain, the superposing the first f-OFDM signal, the second f-OFDM signal, and the third f-OFDM signal may be: connecting the first f-OFDM signal, the second f-OFDM signal, and the third f-OFDM signal in chronological order, as a signal with consecutive time.

In this way, compared with the prior art, in the present application, an OFDM broadband signal is divided into two sideband signals and one intermediate signal. Filtering processing of a spectral mask with a relatively narrow transition band is performed on the two sideband signals. Filtering processing of a spectral mask with a relatively broad transition band is performed on the intermediate signal. The sideband signal is at an edge location. Therefore, even though the spectral mask with a relatively narrow transition band needs to be used to perform filtering, to achieve excellent out-of-band performance, because a bandwidth of a sideband is relatively narrow and a sampling rate is low, a work sampling rate of digital shaping filtering can be well reduced, and filtering implementation is relatively simple. In addition, although a bandwidth of the intermediate signal is relatively broad and a sampling rate is relatively high, because the intermediate signal is located in the middle, the intermediate signal does not have a high requirement on performance of the transition band, and the transition band may be very broad (for example, a left sideband and a right sideband may also be considered as one part of the transition band), a spectral mask with a relatively broad transition band may be used to perform filtering, and filtering is easily implemented. Therefore, considering the entire technical solution provided by the present application, the present application can well reduce filtering complexity during signal transmission.

It may be understood that the foregoing process is mainly for transmission of a downlink signal. During communication, in a reverse process of the process of sending a downlink signal, a same transmitting device may also be used as a receiving device, to receive an uplink signal that is sent by a peer end after the foregoing processing. When receiving the uplink signal, processing performed by the receiving device on the uplink signal may be a reverse process of processing performed on a downlink signal, or there may be some differences.

Figure 6:
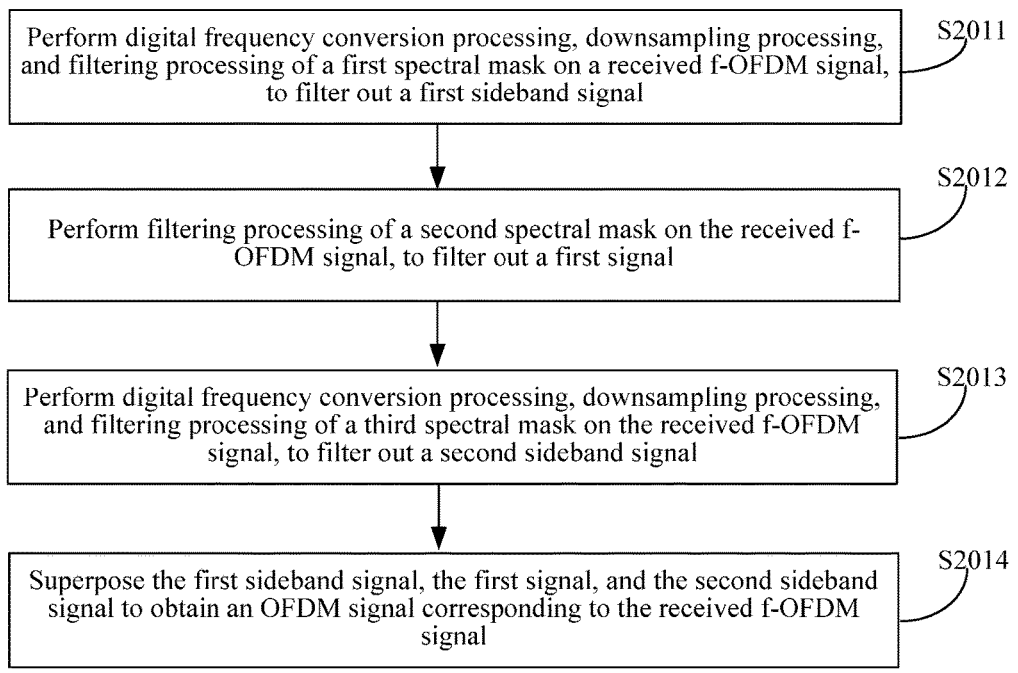
FIG. 6 is a flowchart of a signal processing method according to an embodiment of the present application.

Specifically, as shown in FIG. 6, the present application further provides a signal processing method, used to process a received filtered-orthogonal frequency division multiplexing f-OFDM signal. A transition band of the f-OFDM signal meets a first preset threshold. The signal processing method may include the following steps.

S2011: Perform digital frequency conversion processing, downsampling processing, and filtering processing of a first spectral mask on the received f-OFDM signal, to filter out a first sideband signal.

The digital frequency conversion may be: performing up-conversion on the f-OFDM signal, and moving a center frequency of the f-OFDM signal to a center frequency of the first sideband signal.

The downsampling means: sampling a signal on which digital frequency conversion has been performed, so that a sampling rate of the sampled signal is less than a sampling rate of the signal on which digital frequency conversion has been performed. Optionally, the sampling rate of the sampled signal may be made equal to a first sampling rate used during signal transmission.

S2012: Perform filtering processing of a second spectral mask on the received f-OFDM signal, to filter out a first signal.

S2013: Perform digital frequency conversion processing, downsampling processing, and filtering processing of a third spectral mask on the received f-OFDM signal, to filter out a second sideband signal.

The digital frequency conversion may be: performing down-conversion on the f-OFDM signal, and moving a center frequency of the f-OFDM signal to a center frequency of the second sideband signal.

The downsampling means: sampling a signal on which digital frequency conversion has been performed, so that a sampling rate of the sampled signal is less than a sampling rate of the signal on which digital frequency conversion has been performed. Optionally, the sampling rate of the sampled signal may be made equal to a third sampling rate used during signal transmission.

S2014: Superpose the first sideband signal, the first signal, and the second sideband signal to obtain an OFDM signal corresponding to the received f-OFDM signal.

The first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband.

A bandwidth of the first spectral mask and a bandwidth of the third spectral mask are both less than a bandwidth of the second spectral mask, and a transition band of the first spectral mask and a transition band of the third spectral mask are both less than a transition band of the second spectral mask.

Figure 7:
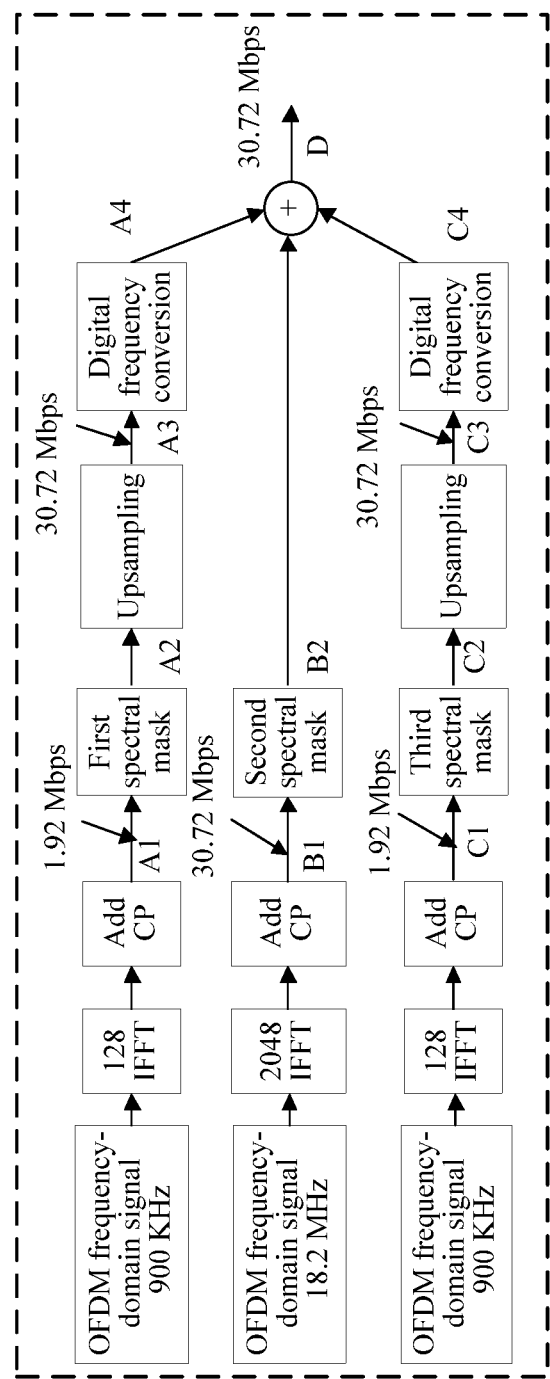
FIG. 7 is a flowchart for transmitting a 20 MHz bandwidth signal according to an embodiment of the present application.
Figure 8A:
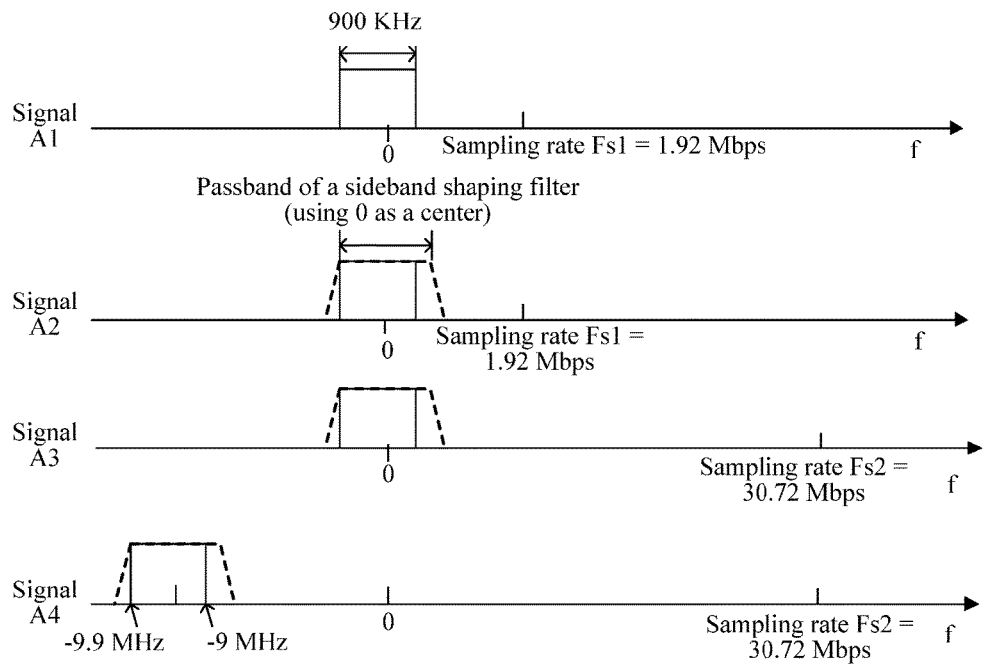
FIG. 8(a) is a schematic diagram of a spectrum according to an embodiment of the present application.
Figure 8B:
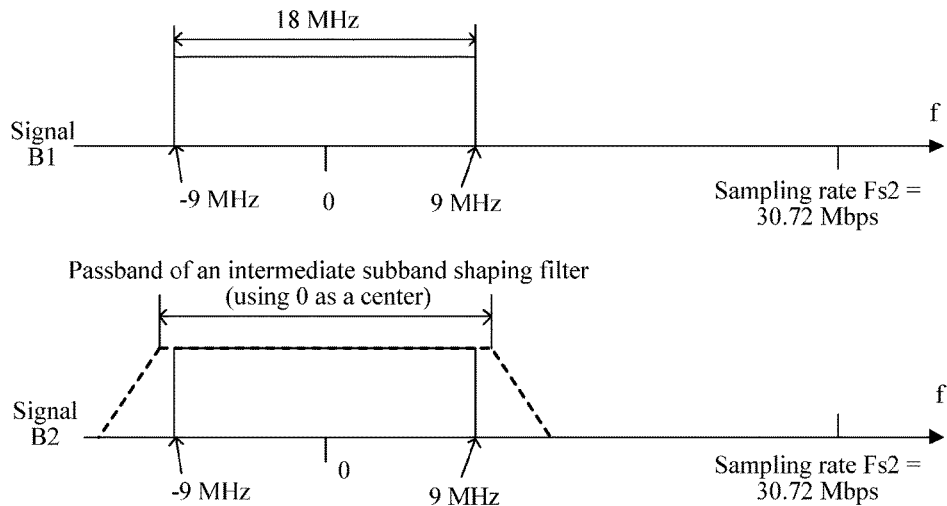
FIG. 8(b) is another schematic diagram of a spectrum according to an embodiment of the present application.
Figure 8C:
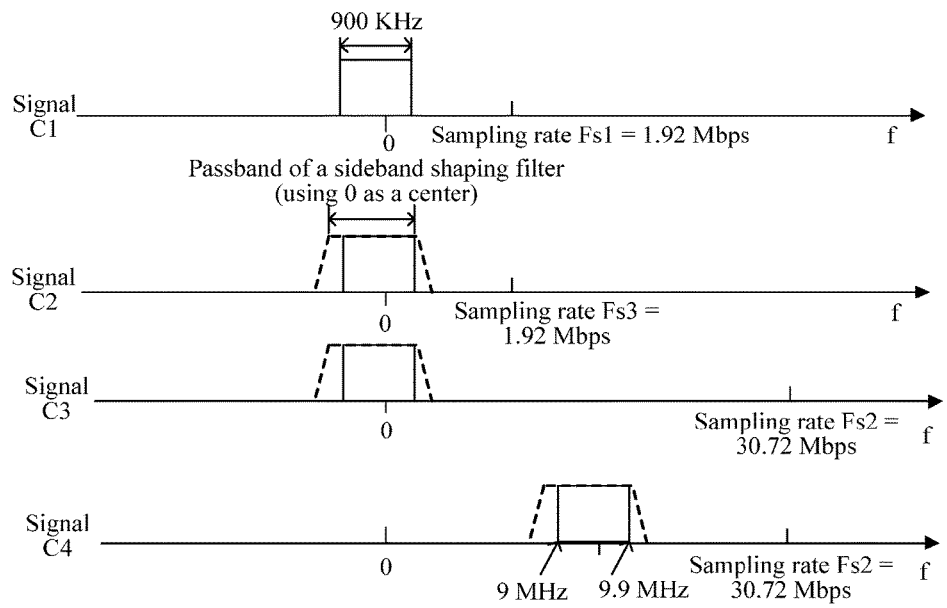
FIG. 8(c) is still another schematic diagram of a spectrum according to an embodiment of the present application.
Figure 8D:
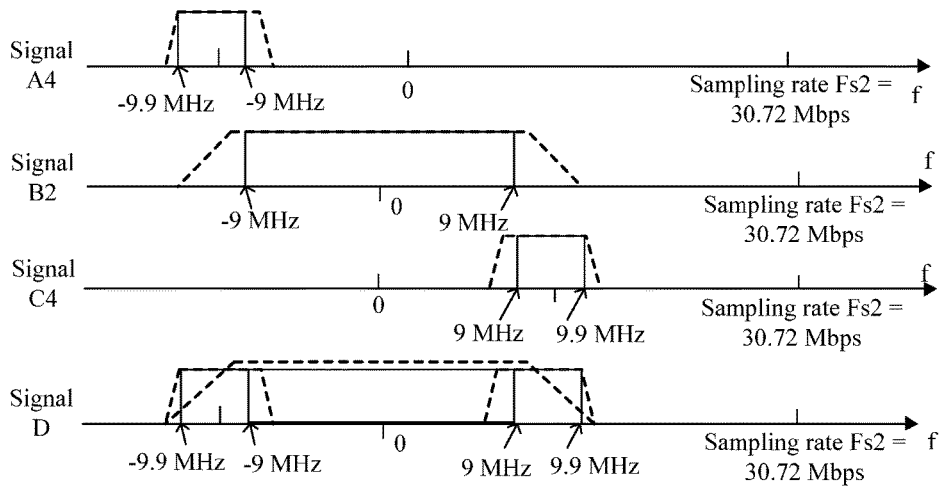
FIG. 8(d) is still another schematic diagram of a spectrum according to an embodiment of the present application.

The following describes the foregoing method with reference to FIG. 7 to FIG. 8(d) by using an example in which an OFDM signal with a bandwidth of 20 MHz specified in LTE:

As shown in FIG. 7, the OFDM signal with the bandwidth of 20 MHz is divided into: a left sideband signal of 900 KHz, an intermediate signal of 18.2 MHz, and a right sideband signal of 900 KHz.

128-point IFFT transform is performed on the left sideband of 900 KHz, to generate a time-domain signal. A cyclic prefix is added to the time-domain signal, to generate a signal A1. Filtering processing of a first spectral mask is performed on the signal A1, to generate a signal A2. Upsampling is performed on the signal A2, to generate a signal A3. Digital up-conversion processing is performed on the signal A3 to obtain a signal A4. Spectrums of the signals A1 to A4 are shown in FIG. 8(a).

2048-point IFFT transform is performed on the intermediate signal of 18.2 MHz, to generate a time-domain signal. A cyclic prefix is added to the time-domain signal, to generate a signal B1. Filtering processing of a second spectral mask is performed on the signal B1, to generate a signal B2. Spectrums of the signals B1 to B4 are shown in FIG. 8(b).

128-point IFFT transform is performed on the right sideband of 900 KHz, to generate a time-domain signal. A cyclic prefix is added to the time-domain signal, to generate a signal C1. Filtering processing of a third spectral mask is performed on the signal C1, to generate a signal C2. Upsampling is performed on the signal C2, to generate a signal C3. Digital up-conversion processing is performed on the signal C3 to obtain a signal C4. Spectrums of the signals C1 to C4 are shown in FIG. 8(c).

The signal A4, the signal B2, and the signal C4 are superposed to form a signal D. The signal D obtained after the superposing is used as an f-OFDM signal of the OFDM signal. For example, as shown in FIG. 8(d), the spectrums of the signal A4, the signal B2, and the signal C4 are combined to form the signal D.

During time domain filtering, M times of complex multiplication and M−1 times of complex addition (M is a filtering order) are needed for each input time domain sampling point, and a filtering signal corresponding to the sampling point can be obtained only in this way. In this case, if filtering orders of the first spectral mask and the third spectral mask used in this embodiment of the present application are both 16, a filtering order of the second spectral mask is 4, 10 thousand points are sampled per second at a high sampling rate of 30.72 Mbps, and 10 points are sampled per second at a low sampling rate of 1.92 Mbps, for the OFDM signal with the bandwidth of 20 MHz, 10000*16*15=2.4 million times of computation are required when the existing filtering process in FIG. 1 is used, and 10*16*15+10000*4*3+10*16*15=74.8 thousand times of computation are required when the filtering process in FIG. 7 is used. As can be learned by comparing amounts of computation for filtering the OFDM signal in FIG. 1 and FIG. 7: the filtering method used in this embodiment of the present application greatly reduces filtering complexity.

In addition, it should be noted that when a filter of each subband signal is designed, a passband bandwidth of the filter is greater than a bandwidth of subband data, and a particular bandwidth margin needs to be reserved both on the left of the left sideband and on the right of the right sideband, so as to avoid impact of a filtering operation on subcarrier performance on an edge of a subband. For example, as shown in FIG. 8(a), a right side of a passband of a sideband shaping filter of a left sideband signal is appropriately broader than a left side. In this way, a particular bandwidth margin is reserved on a right side of a sideband signal obtained after the filter process. Similarly, as shown in FIG. 8(c), a left side of a passband of a sideband shaping filter of a right sideband signal is appropriately broader than a right side. In this way, a particular bandwidth margin is reserved on a left side of a sideband signal obtained after the filter process.

Figure 9:
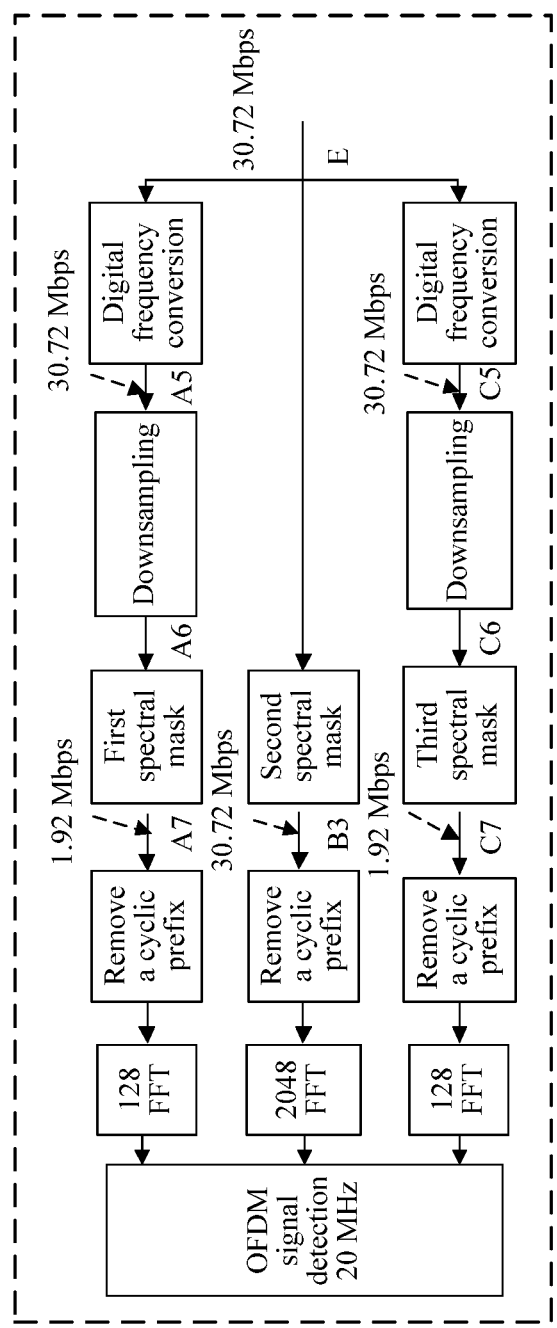
FIG. 9 is a flowchart for receiving a filtered f-OFDM signal according to an embodiment of the present application.

Correspondingly, in a reverse processing process of sending a signal, when a filtered f-OFDM signal with a bandwidth of 20 MHz is received, a process shown in FIG. 9 is performed.

Figure 10A:
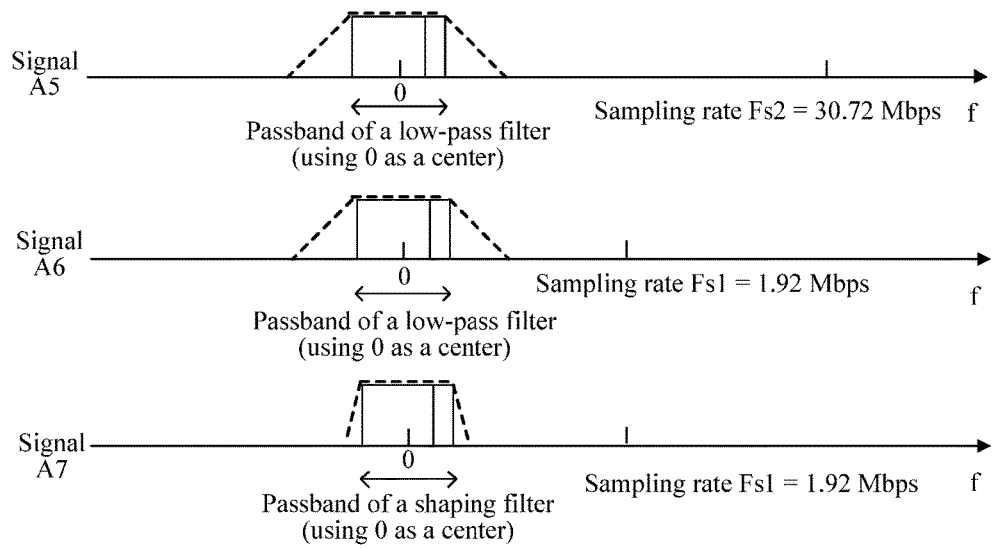
FIG. 10(a) is another schematic diagram of a spectrum according to an embodiment of the present application.
Figure 10B:
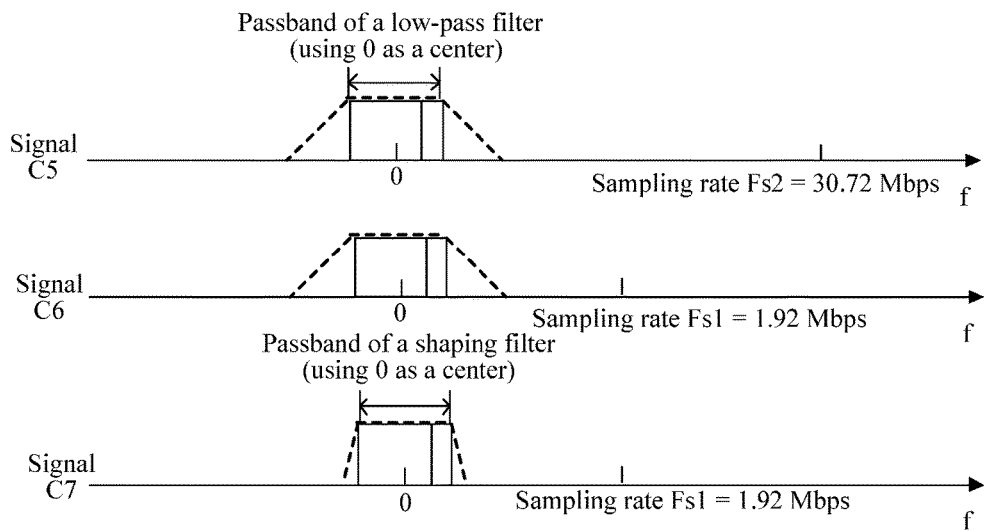
FIG. 10(b) is another schematic diagram of a spectrum according to an embodiment of the present application.

After digital frequency conversion processing is performed on the received f-OFDM signal with the bandwidth of 20 MHz, the signal passes a low-pass filter, to obtain a left sideband signal A5. Downsampling is performed on the signal A5 by using a sampling frequency of 1.92 Mbps, to generate a signal A6. The signal A6 is filtered by means of the filtering processing of the first spectral mask used during filtering of the left sideband signal in the foregoing sending process, to generate a signal A7. A cyclic prefix is removed from the signal A7, and 128-point FFT transform is performed on the signal A7, to restore the left sideband signal of 900 KHz. Spectrums of the signals A5 to A7 are shown in FIG. 10 (a).

The received f-OFDM signal with the bandwidth of 20 MHz is directly filtered by means of the filtering processing of the second spectral mask used during filtering of the intermediate signal of 18.2 MHz in the foregoing sending process, to generate a signal B3. A cyclic prefix is removed from the signal B3, and 2048-point FFT transform is performed on the signal B3, to restore the intermediate signal of 18.2 MHz.

After digital frequency conversion processing is performed on the received f-OFDM signal with the bandwidth of 20 MHz, the signal is filtered by a low-pass filter, to obtain a right sideband signal C5. Downsampling is performed on the signal C5 by using a sampling frequency of 1.92 Mbps, to generate a signal C6. The signal C6 is filtered by means of the filtering processing of the third spectral mask used during filtering of the right sideband signal in the foregoing sending process, to generate a signal C7. A cyclic prefix is removed from the signal C7, and 128-point FFT transform is performed on the signal C7, to restore the left sideband signal of 900 KHz. Spectrums of the signals C5 to C7 are shown in FIG. 10 (b).

It should be noted that the low-pass filter used above does not need to have a steep transition band. An objective of the low-pass filter is only to filter out an in-band signal, and to prevent spectral aliasing caused by downsampling.

In addition, it may be understood that same as the design of the shaping filter during transmission, a passband of a shaping filter used during receiving also needs to be designed in such a manner that a particular margin is reserved based on a signal bandwidth, so as to avoid impact of a filter operation on subcarrier performance on an edge of an adjacent subband.

It should be noted that for an ultra-broadband signal (such as a signal with a bandwidth of 100 MHz) with a broader bandwidth, if the foregoing bandwidth division method is directly used, a sampling rate of an intermediate subband signal with a broad bandwidth is still very high (for example, when a bandwidth of the intermediate subband signal is approximately 100 MHz, a required sampling rate is 8192*15 KHz=122.880 Mbps). Although the filter may be implemented by using a filter in a time domain, because the sampling rate is relatively high, a required amount of computation is still very large, and such a method needs to ensure that there is only one OFDM parameter on the entire OFDM signal. Therefore, when a bandwidth of an intermediate signal obtained by dividing the OFDM signal is relatively broad, to avoid an operation of a high sampling rate, and to configure a plurality of different OFDM parameters in one OFDM broadband signal, a system bandwidth of the entire OFDM signal may be first divided into several OFDM signals with relatively narrow bandwidths. Each OFDM signal with a relatively narrow bandwidth is filtered by using a filtering policy shown in FIG. 5, to obtain an f-OFDM signal of each OFDM signal bandwidth with a relatively narrow bandwidth. The obtained f-OFDM signals are combined to obtain an f-OFDM signal of the original OFDM signal with a broad bandwidth.

Further, when M OFDM signals with contiguous frequencies that include the OFDM are transmitted, where M is an integer greater than or equal to 2, and parameters of the M OFDM signals are different from each other, the signal processing method may include:

separately processing the M OFDM signals based on the preset filtering policy, to obtain M f-OFDM signals; and superposing the M f-OFDM signals and transmitting the superposed M f-OFDM signals.

Correspondingly, for a receiver, if the receiver processes received M OFDM signals with contiguous frequencies that include the f-OFDM, where M is an integer greater than or equal to 2, and if transition bands of the M f-OFDM signals all meet the first preset threshold, the signal processing method may further include:

separately processing the M f-OFDM signals based on the preset signal processing policy, to obtain M OFDM signals.

Figure 11:
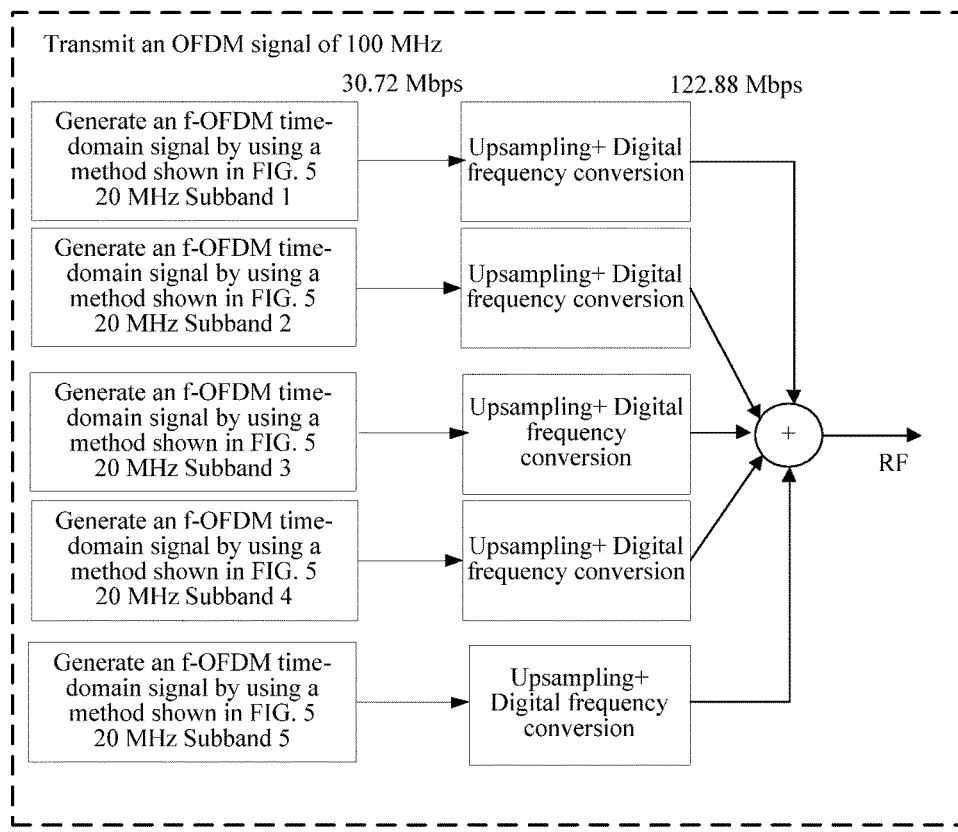
FIG. 11 is a structural diagram of a transmitted signal according to an embodiment of the present application.

For example, if parameters of five to-be-transmitted OFDM signals of 20 MHz with contiguous spectrums are different from each other, as shown in FIG. 11, each of the OFDM signals may be filtered by using the filtering method shown in FIG. 5, to obtain an f-OFDM signal of each OFDM signal. Then, a spectrum of the f-OFDM signal of each OFDM signal is moved to a corresponding spectral location in a spectrum of the entire OFDM signal of 100 MHz by means of digital up-conversion, to obtain a filtered f-OFDM signal of the OFDM signal of 100 MHz through combination.

It should be noted that bandwidths of all of the M OFDM signals may be the same or different. In this case, each OFDM subsignal of 20 MHz is filtered in the foregoing filtering manner, so that there is very good frequency domain isolation between any two adjacent OFDM subsignals, OFDM parameters may be arbitrarily configured, and no mutual interference is caused.

Figure 12:
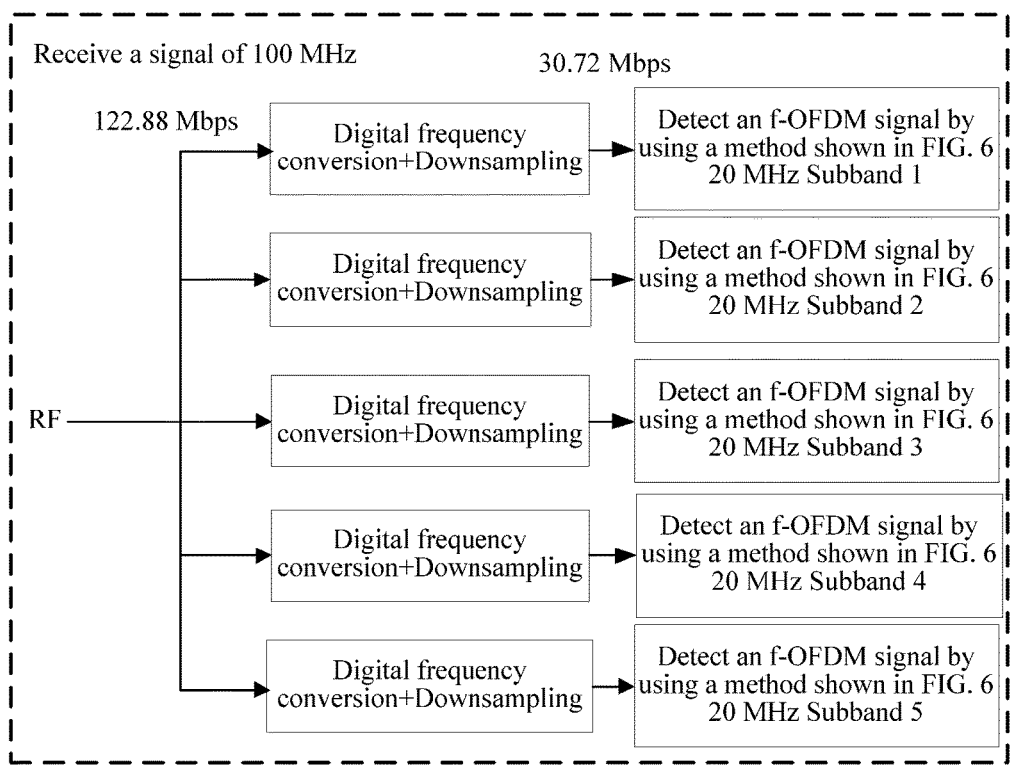
FIG. 12 is a structural diagram of a received signal according to an embodiment of the present application.

Relatively, in a reverse processing process of sending a signal, when the f-OFDM signal of 100 MHz obtained by combining the f-OFDM signals of the five OFDM signals is received, as shown in FIG. 12, the f-OFDM signal of 100 MHz may be first filtered by five different low-pass filters separately, to filter out f-OFDM signals of the five OFDM signals. Then, the f-OFDM signal of each OFDM signal is processed by using the processing method shown in FIG. 6, to restore each OFDM signal of 20 MHz.

However, when OFDM signals in the middle of a plurality of OFDM signals other than sideband signals on two sides are synchronized with each other and have a same OFDM parameter, these subbands only need to be filtered by using a spectral mask with a relatively broad transition band to reduce filtering complexity, so as to control a remote spectral leakage generated by these OFDM signals out of a bandwidth of the system instead of a spectral leakage of an adjacent band other than a current OFDM signal. Therefore, there may be a lower requirement on a transition band index of a filter of the plurality of OFDM signals in the middle that have the same parameter. However, for subbands located at two sides of a system bandwidth and subbands within the system bandwidth that use different OFDM parameters, a filter with an extremely narrow transition band needs to be used, to control a spectral leakage of an adjacent band other than these subbands. This can further reduce complexity of a filtering operation of the entire system. A specific implementation is as follows:

If a first group of OFDM signals exist in the M OFDM signals, the first group of OFDM signals include i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and 2≤i≤M, the method further includes:

processing a first OFDM signal in the i OFDM signals based on the filtering policy, to obtain an f-OFDM signal corresponding to the first OFDM signal, where the first OFDM signal is located in a first edge of the i OFDM signals with contiguous frequencies;

processing a second OFDM signal in the i OFDM signals based on the filtering policy, to obtain an f-OFDM signal corresponding to the second OFDM signal, where the second OFDM signal is located in a second edge of the i OFDM signals with contiguous frequencies;

separately performing filtering processing of a fourth spectral mask on each of the i OFDM signals other than the first OFDM signal and the second OFDM signal, to obtain (i−2) f-OFDM signals;

separately processing the (M−i) OFDM signals based on the filtering policy, to obtain (M−i) f-OFDM signals; and superposing the f-OFDM signal corresponding to the first OFDM signal, the f-OFDM signal corresponding to the second OFDM signal, the (i−2) f-OFDM signals, and the (M−i) f-OFDM signals, and transmitting the superposed f-OFDM signals.

A bandwidth of a transition band of the fourth spectral mask may be greater than a second preset threshold, that is, a signal on which filtering of the fourth spectral mask has been performed may leak within the band. The second preset threshold may be set as required, and this is not limited in this embodiment of the present application. When the bandwidth of the transition band of the fourth spectral mask may be greater than the second preset threshold, it indicates that the signal on which filtering of the fourth spectral mask has been performed may have a relatively broad bandwidth, and may leak within the band. Because a lower filtering order of a spectral mask indicates a larger transition band, correspondingly, a filtering order of the fourth spectral mask may be set relatively low, to reduce filtering complexity.

Correspondingly, for a receiver, if a first group of f-OFDM signals exist in the received M f-OFDM signals, the first group of f-OFDM signals include i f-OFDM signals with contiguous frequencies, transition bands of the i f-OFDM signals do not meet the first preset threshold, transition bands of (M−i) f-OFDM signals in the M f-OFDM signals other than the i signals meet the first preset threshold, and 2≤i≤M, the signal processing method may further include:

performing filtering processing of a fourth spectral mask on each of the i f-OFDM signals, to obtain i OFDM signals, where a bandwidth of a transition band of the fourth spectral mask is greater than a second preset threshold; and processing each of the (M−i) f-OFDM signals based on the signal processing policy, to obtain (M−i) OFDM signals.

For example, if the foregoing five OFDM signals of 20 MHz are separately as follows in an order of spectrums from left to right: an OFDM signal 1, an OFDM signal 2, an OFDM signal 3, an OFDM signal 4, and an OFDM signal 5, and the OFDM signal 1 and the OFDM signal 5 are two edge subband signals of the entire system the bandwidth, and if the OFDM signal 1, the OFDM signal 2, the OFDM signal 3, and the OFDM signal 4 use a same OFDM parameter, but the OFDM signal 5 uses an OFDM parameter different from that of the other four OFDM signals, when all subband signals are synchronized, there is no interference among the OFDM signal 1, the OFDM signal 2, the OFDM signal 3, and the OFDM signal 4, but there is interference between the OFDM signal 4 and the OFDM signal 5.

Figure 13:
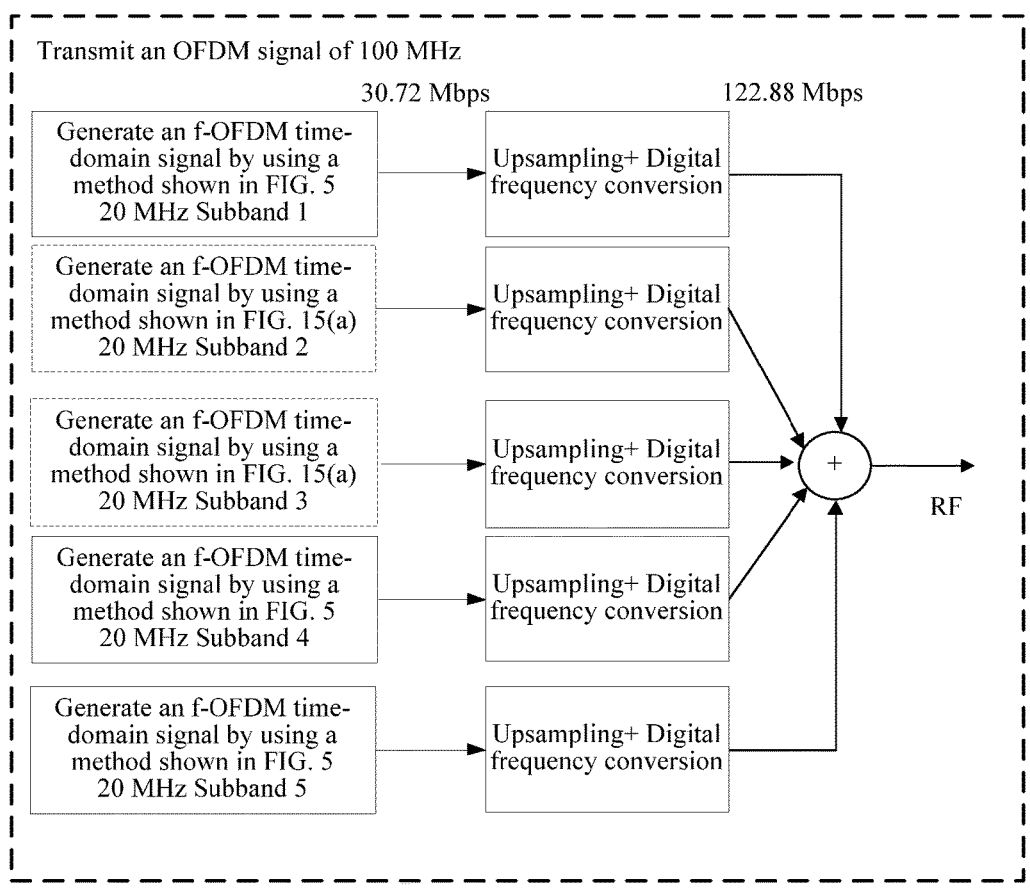
FIG. 13 is another structural diagram of a transmitted signal according to an embodiment of the present application.
Figure 14:
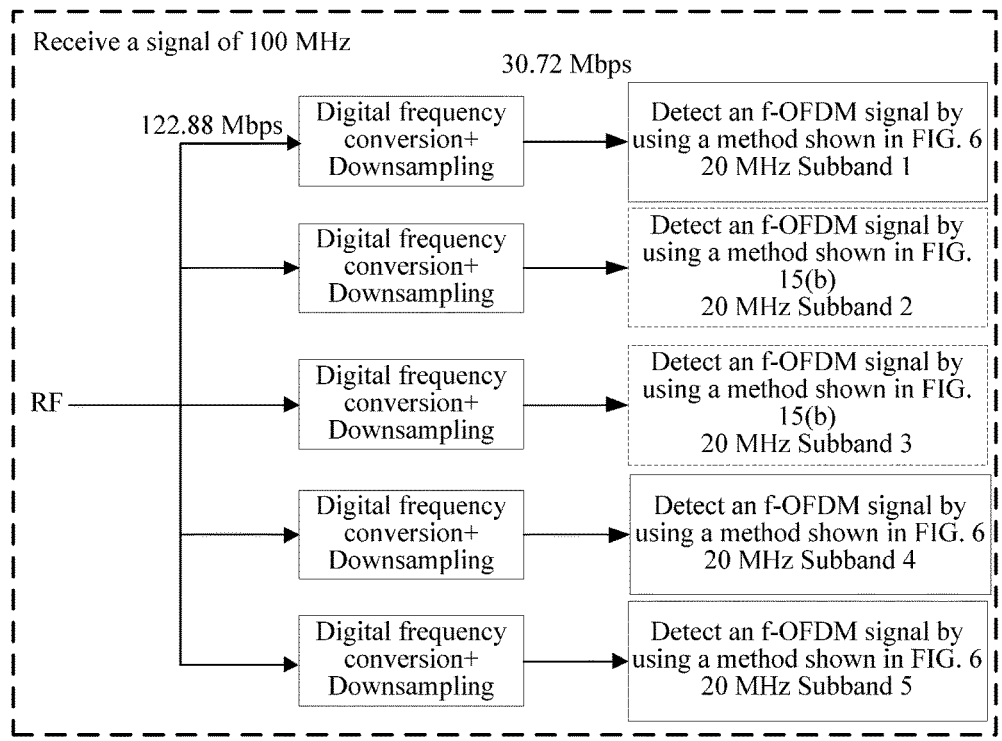
FIG. 14 is another structural diagram of a received signal according to an embodiment of the present application.
Figure 15A:
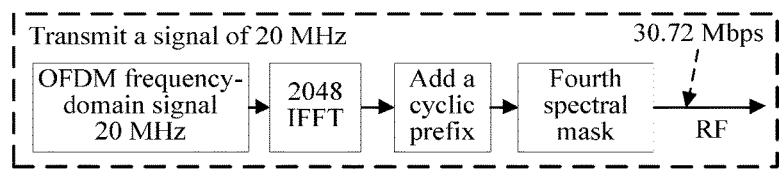
FIG. 15(a) is still another structural diagram of a transmitted signal according to an embodiment of the present application.
Figure 15B:
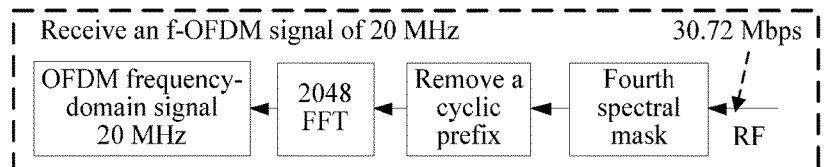
FIG. 15(b) is still another structural diagram of a received signal according to an embodiment of the present application.

Therefore, as shown in FIG. 13, in a simplified structural transmission diagram of a signal with a bandwidth of 100 MHz, the OFDM signal 1, the OFDM signal 4, and the OFDM signal obtained through division may be implemented by using the filtering method shown in FIG. 5. Filtering of an extremely narrow transition band is performed on sideband signals of the two OFDM signals, to prevent an adjacent band leakage of a frequency band of a current OFDM signal. However, as shown in FIG. 15 (*a*), filtering processing of a fourth spectral mask with a relatively broad transition band may be performed on the OFDM signal 2 and the OFDM signal 3, so as to prevent remote spectral leakages, generated out of the bands, of the OFDM signal 4 and the OFDM signal 1. Subsequently, an f-OFDM signal of each OFDM signal is moved to a corresponding spectral location of the spectrum of entire 100 MHz, to be combined as a filtered f-OFDM signal of 100 MHz, and transmitted. Correspondingly, as shown in FIG. 14, in a simplified structural receiving diagram of a signal with a bandwidth of 100 MHz, three f-OFDM signals of the obtained OFDM signal 1, OFDM signal 4, and OFDM signal are separately detected by using the method shown in FIG. 6, but filtering processing of a fourth spectral mask shown in FIG. 15 (*b*) may be performed on two f-OFDM signals of the obtained OFDM signal 2 and the OFDM signal 3, to restore the original signal. In this way, in the entire filtering solution, because filtering index requirements for the OFDM signal 2 and the OFDM signal 3 are lower, the filtering solution is further simplified.

It can be learned from the foregoing that this embodiment of the present application provides the signal processing method. The to-be-transmitted OFDM signal is divided into the first sideband signal, the first signal, and the second sideband signal. The first sideband signal is located in the left sideband of the to-be-transmitted OFDM signal, the second sideband signal is located in the right sideband of the to-be-transmitted OFDM signal, and the first signal is located in the intermediate frequency band in the to-be-transmitted OFDM signal other than the left sideband and the right sideband. The bandwidth of the first sideband signal and the bandwidth of the second sideband signal are both less than the bandwidth of the first signal. The first sideband signal is sampled by using the first sampling rate, and filtering processing of the first spectral mask, upsampling processing, and digital frequency conversion processing are performed on the sampled signal, to generate the first f-OFDM signal. The first signal is sampled by using the second sampling rate, and filtering processing of the second spectral mask is performed on the sampled signal, to generate the second f-OFDM signal. The second sideband signal is sampled by using the third sampling rate, and filtering processing of the third spectral mask, upsampling processing, and digital frequency conversion processing are performed on the sampled signal, to generate the third f-OFDM signal. The first f-OFDM signal, the second f-OFDM signal, and the third f-OFDM signal are superposed to obtain the f-OFDM signal, and the f-OFDM signal is transmitted. The first sampling rate and the third sampling rate are both less than the second sampling rate. The bandwidth of the transition band of the first f-OFDM signal and the bandwidth of the transition band of the third f-OFDM signal are both less than the preset threshold. The bandwidth of the transition band of the second f-OFDM signal is greater than the preset threshold. In this way, compared with the prior art, in the present application, an OFDM broadband signal is divided into two sideband signals and one intermediate signal. Filtering processing of a spectral mask with a relatively narrow transition band is performed on the two sideband signals. Filtering processing of a spectral mask with a relatively broad transition band is performed on the intermediate signal. The sideband signal is at an edge location. Therefore, even though filtering needs to be performed by means of shaping filtering, to obtain a very narrow transition band and achieve excellent out-of-band performance, because a bandwidth of a sideband is relatively narrow and a sampling rate is low, a work sampling rate of the filtering processing of the spectral mask can be well reduced, and filtering is easily implemented. In addition, although a bandwidth of the intermediate signal is relatively broad and a sampling rate is relatively high, because the intermediate signal is located in the middle, the intermediate signal does not have a high requirement on performance of the transition band, and the transition band may be very broad, filtering may be performed by means of shaping filtering with a very low order, and filtering is easily implemented. Therefore, considering the entire technical solution provided by the present application, filtering complexity can be well reduced.

According to this embodiment of the present application, the following embodiment of the present application further provides a transmitter 30, preferably configured to perform the signal processing method shown in FIG. 5.

Embodiment 2

Figure 16:
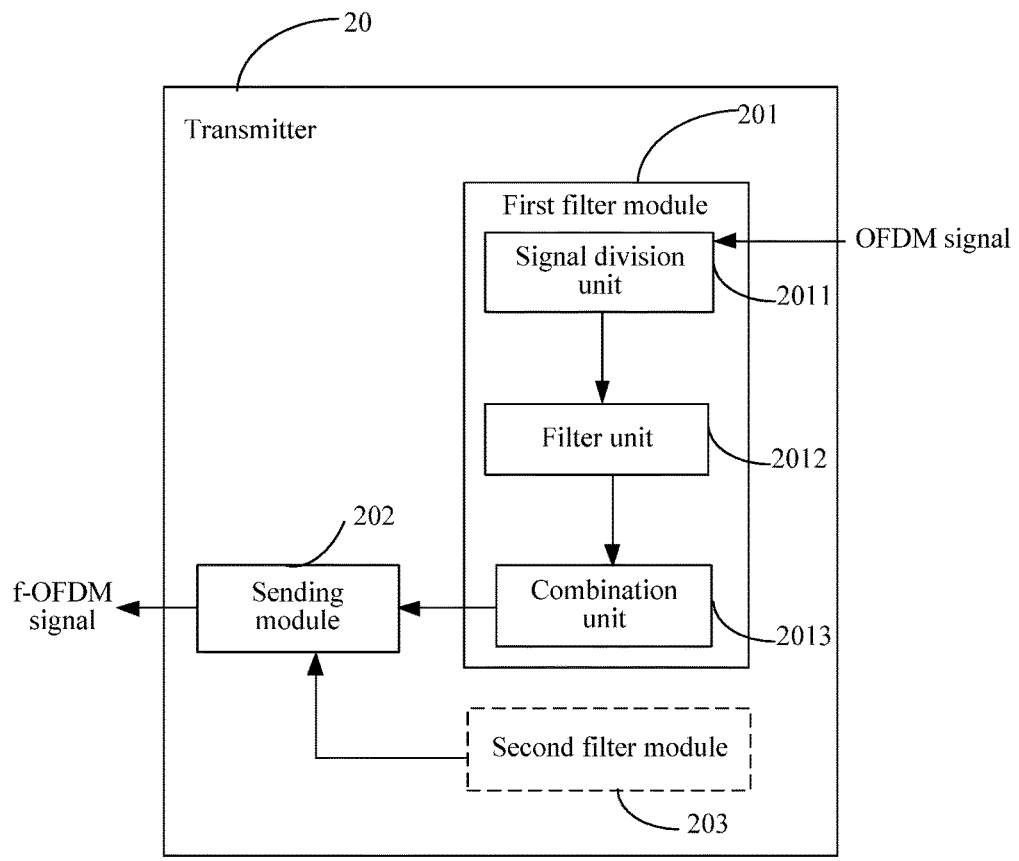
FIG. 16 is a structural diagram of a transmitter 30 according to an embodiment of the present application.

FIG. 16 is a structural diagram of a transmitter 20 according to an embodiment of the present application. The transmitter 20 is configured to perform the signal processing method described in Embodiment 1, to transmit an orthogonal frequency division multiplexing OFDM signal. As shown in FIG. 16, the transmitter 20 may include:

a first filter module 201, configured to filter the OFDM signal, to obtain an f-OFDM signal; and a sending module 202, configured to transmit the f-OFDM signal obtained by the first filter module 201.

As shown in FIG. 16, the first filter module 201 may specifically include:

a signal division unit 2011, configured to divide a to-be-transmitted OFDM signal into a first sideband signal, a first signal, and a second sideband signal, where the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal;

The left sideband and the right sideband may be two edge bands of an OFDM spectrum. For example, as shown in FIG. 1, the left sideband may be a frequency band in a left edge of the spectrum, and the right sideband may be a frequency band in a right edge of the spectrum. It may be understood that in this embodiment of the present application, a location or a location relationship indicated based on a term "left" or "right" is a location or a location relationship shown based on the accompanying drawing, merely for convenience of describing the present application and for brevity of description, but not for indicating or implicitly indicating that a described object needs to have a particular location or be constructed or operated at a particular location. Therefore, the location or the location relationship cannot be construed as a limitation to the present application.

The bandwidth of the first sideband signal and the bandwidth of the second sideband signal are both less than the bandwidth of the first signal. The bandwidth of the first sideband signal and the bandwidth of the second sideband signal may be the same. Specific values of signal bandwidths obtained through division may be arbitrary. This is not limited in this embodiment of the present application. Specifically, the bandwidth may be flexibly divided based on a processing capability of hardware, but in principle, values of the bandwidth of the first sideband signal and the bandwidth of the second sideband signal should be as small as possible (that is, the first sideband signal and the second sideband signal are narrowband signals), to ensure a relatively low sampling rate of the sideband signal. The first signal may be a broadband signal in a middle part.

Because it is specified in a communication protocol that one OFDM signal may include at least one subcarrier (as shown in FIG. 1), the following principle may be followed during signal division: subcarriers on the left of an OFDM signal are used as a first sideband signal, and subcarriers on the right of the OFDM signal are used as a second sideband signal, and remaining subcarriers are used as a first signal.

a filter unit 2012, configured to: sample, by using a first sampling rate, the first sideband signal obtained through division by the signal division unit 2011, and perform filtering processing of a first spectral mask, upsampling processing, and digital frequency conversion processing on a sampled signal, to generate a first f-OFDM signal; and Because the to-be-transmitted OFDM signal described in this embodiment of the present application is a baseband frequency-domain signal, sampling of the first sideband signal by using the first sampling rate may be implemented by using an IFFT technology. The first sampling rate may be a single sampling rate of the first sideband signal. The single sampling rate is a bandwidth of $2^n$ subcarriers, where $2^n$ is closest to a quantity of subcarriers included in the first sideband signal, and n is an integer greater than or equal to 1. For example, if a bandwidth of the first sideband signal is 900 kHz, and a bandwidth of each subcarrier is 15 kHz, the first sideband signal includes 60 subcarriers, $2^n$ closest to 60 is 128, and the first sampling rate is: 128*15=1920 kbps=1.92 Mbps.

A transition band of the first spectral mask is relatively narrow, to ensure that a filtered signal has a very narrow transition band, to achieve favorable out-of-band performance. Because a higher filtering order of a spectral mask indicates a narrower transition band of a filtered signal, correspondingly, the first spectral mask may be a digital shaping filtering mask with a relatively high filtering order.

The upsampling means: sampling a signal on which filtering of the first spectral mask has been performed, so that a sampling rate of a sampled signal is greater than a sampling rate of the filtered signal, and a finally obtained single sampling rate of the first f-OFDM signal is the same as a single sampling rate of an original OFDM signal.

The digital frequency conversion means: performing spectrum movement on a signal on which up-sampling has been performed, to move the signal to a spectral location of the first sideband signal.

It should be noted that after the first sideband signal is sampled by using the first sampling rate, the first sideband signal changes to a signal that is discrete in time. In this case, to prevent interference between signals, a cyclic prefix may be further added (Add CP) to the sampled signal, and filtering processing of the first spectral mask, upsampling processing, and up-conversion processing are performed on the sampled signal to which the cyclic prefix has been added, to generate the first f-OFDM signal.

The filter unit 2012 is further configured to: sample, by using a second sampling rate, the first signal obtained through division by the signal division unit 2011, and perform filtering processing of a second spectral mask on a sampled signal, to generate a second f-OFDM signal.

Sampling of the first signal by using the second sampling rate may be implemented by using an IFFT technology. Because the first signal is an intermediate signal of the original OFDM signal, and a bandwidth of the first signal is relatively close to a bandwidth of the original OFDM signal, the second sampling rate basically may be a single sampling rate of the OFDM signal, so that a single sampling rate of the second f-OFDM signal generated after the sampling and filtering is the same as the single sampling rate of the original OFDM signal. In addition, the bandwidth of the first sideband signal and the bandwidth of the second sideband signal are both greatly less than the bandwidth of the first signal. Therefore, a single sampling rate of the first sideband signal and a single sampling rate of the second sideband signal are both greatly less than a single sampling rate of the first signal when the single sampling rate of the first signal is used as the sampling rate. Therefore, when a single sampling rate of a signal is used as a sampling rate to perform sampling, the second sampling rate is greater than the first sampling rate and the third sampling rate in step S1014.

Because the first signal is an intermediate signal of the original OFDM signal and may have a relatively broad transition band (for example, a frequency band of the first sideband signal and a frequency band of the second sideband signal may be used as transition bands of the first signal), when the filtering processing of the second spectral mask is performed on the first signal, a spectral mask whose transition band is relatively broad may be used for filtering. That is, a filtering order of the second spectral mask may be set relatively small, to reduce filtering complexity. Optionally, in this embodiment of the present application, a transition band of the second spectral mask may be set greater than a transition band of the first spectral mask and a transition band of a third spectral mask.

It should be noted that after the first signal is sampled by using the second sampling rate, the first signal changes to a signal that is discrete in time. In this case, to prevent interference between signals, a cyclic prefix may be added (Add CP) to the sampled signal, and filtering processing of the second spectral mask is performed on the signal to which the cyclic prefix has been added, to generate the second f-OFDM signal.

The filter unit 2012 is further configured to: sample, by using a third sampling rate, the second sideband signal obtained through division by the signal division unit 2011, and perform filtering processing of a third spectral mask, upsampling processing, and digital frequency conversion processing on a sampled signal, to generate a third f-OFDM signal.

Sampling of the second sideband signal by using the third sampling rate may be implemented by using an IFFT technology. The third sampling rate may be a single sampling rate of the second sideband signal. The single sampling rate is a bandwidth of $2^n$ subcarriers, where $2^n$ is closest to a quantity of subcarriers included in the second sideband signal, and n is an integer greater than or equal to 1.

Same as the first spectral mask, the third spectral mask also has a relatively narrow transition band, to ensure that a filtered signal has a very narrow transition band, to achieve favorable out-of-band performance. Because a higher filtering order of a spectral mask indicates a narrower transition band of a filtered signal, correspondingly, the third spectral mask may be a digital shaping filtering mask with a relatively high filtering order.

The upsampling means: sampling a signal on which filtering of the third spectral mask has been performed, so that a sampling rate of a sampled signal is greater than a sampling rate of the filtered signal.

The digital frequency conversion means: performing spectrum movement on a signal on which up-sampling has been performed, to move the signal to a spectral location of the second sideband signal.

It should be noted that after the second sideband signal is sampled by using the third sampling rate, the second sideband signal changes to a signal that is discrete in time. In this case, to prevent interference between signals, a cyclic prefix may be further added (Add CP) to the sampled signal, and filtering processing of the third spectral mask, upsampling processing, and up-conversion processing are performed on the sampled signal to which the cyclic prefix has been added, to generate the third f-OFDM signal.

a combination unit 2013, configured to superpose the first f-OFDM signal, the second f-OFDM signal, and the third f-OFDM signal that are obtained through filtering by the filter unit 2012, to obtain the f-OFDM signal.

A spectrum of the first f-OFDM signal has been moved to a spectral location that is in a spectrum of the OFDM signal and that corresponds to the first sideband signal, a spectrum of the second f-OFDM signal is at a spectral location that is in the spectrum of the OFDM signal and that corresponds to a spectrum of the first signal, and a third f-OFDM signal has been moved to a spectral location that is in the spectrum of the OFDM signal and that corresponds to the second sideband signal. Therefore, in terms of a frequency domain, the superposing the first f-OFDM signal, the second f-OFDM signal, and the third f-OFDM signal may be: superposing the spectrum of the first f-OFDM signal, the spectrum of the second f-OFDM signal, and a spectrum of the third f-OFDM signal, as a spectrum of a complete signal. Alternatively, in terms of a time domain, the superposing the first f-OFDM signal, the second f-OFDM signal, and the third f-OFDM signal may be: connecting the first f-OFDM signal, the second f-OFDM signal, and the third f-OFDM signal in chronological order, as a signal with consecutive time.

The first sampling rate and the third sampling rate are both less than the second sampling rate. In addition, regardless of settings of transitions of the first spectral mask, the second spectral mask, and the third spectral mask, it needs to be ensured that an out-of-band leakage of the OFDM signal on which filtering of the first spectral mask, filtering of the second spectral mask, and filtering of the third spectral mask have been performed meets the first preset threshold. The first preset threshold may be set as required. This is not limited in this embodiment of the present application. When the out-of-band leakage of the OFDM signal meets the first preset threshold, it indicates that the signal has favorable out-of-band performance, and does not interfere with another signal. When the out-of-band leakage of the OFDM signal does not meet the first preset threshold, it indicates that the out-of-band leakage of the signal is relatively great, seriously affecting another signal.

Further, the transmitter is further configured to transmit M OFDM signals with contiguous frequencies that include the OFDM, where M is an integer greater than or equal to 2, and if parameters of the M OFDM signals are different from each other, the first filter module 201 may be further configured to:

separately process the M OFDM signals, to obtain M f-OFDM signals; and the sending module 202 is further configured to: superpose the M f-OFDM signals obtained by the first filter module 201, and transmit the M f-OFDM signals.

It should be noted that bandwidths of all of the M OFDM signals may be the same or different.

However, when OFDM signals in the middle of a plurality of OFDM signals other than sideband signals on two sides are synchronized with each other and have a same OFDM parameter, these subbands only need to be filtered by using a spectral mask with a relatively broad transition band to reduce filtering complexity, so as to control a remote spectral leakage generated by these OFDM signals out of a bandwidth of the system instead of a spectral leakage of an adjacent band other than a current OFDM signal. Therefore, there may be a lower requirement on a transition band index of a filter of the plurality of OFDM signals in the middle that have the same parameter. However, for subbands located at two sides of a system bandwidth and subbands within the system bandwidth that use different OFDM parameters, a filter with an extremely narrow transition band needs to be used, to control a spectral leakage of an adjacent band other than these subbands. This can further reduce complexity of a filtering operation of the entire system. Specifically, if a first group of OFDM signals exist in the M OFDM signals, the first group of OFDM signals include i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and $2 \le i \le M$, the first filter module 201 is further configured to:

filter a first OFDM signal in the i OFDM signals, to obtain an f-OFDM signal corresponding to the first OFDM signal, where the first OFDM signal is located in a first edge of the i OFDM signals with contiguous frequencies;

filter a second OFDM signal in the i OFDM signals, to obtain an f-OFDM signal corresponding to the second OFDM signal, where the second OFDM signal is located in a second edge of the i OFDM signals with contiguous frequencies; and separately filter the (M−i) OFDM signals, to obtain (M−i) f-OFDM signals;

the transmitter further includes a second filter module 203, where the second filter module 203 is configured to separately perform filtering processing of a fourth spectral mask on each of the i OFDM signals other than the first OFDM signal and the second OFDM signal, to obtain (i−2) f-OFDM signals, where a bandwidth of a transition band of the fourth spectral mask may be greater than a second preset threshold, that is, a signal on which filtering of the fourth spectral mask has been performed may leak within the band. The second preset threshold may be set as required, and this is not limited in this embodiment of the present application. When the bandwidth of the transition band of the fourth spectral mask may be greater than the second preset threshold, it indicates that the signal on which filtering of the fourth spectral mask has been performed may have a relatively broad bandwidth, and may leak within the band. Because a lower filtering order of a spectral mask indicates a larger transition band, correspondingly, a filtering order of the fourth spectral mask may be set relatively low, to reduce filtering complexity.

The sending module 202 is further configured to: superpose the f-OFDM signal corresponding to the first OFDM signal, the f-OFDM signal corresponding to the second OFDM signal, the (i−2) f-OFDM signals, and the (M−i) f-OFDM signals, and transmit the superposed f-OFDM signals.

It can be learned from the foregoing that this embodiment of the present application provides the transmitter. The to-be-transmitted OFDM signal is divided into the first sideband signal, the first signal, and the second sideband signal. The first sideband signal is located in the left sideband of the to-be-transmitted OFDM signal, the second sideband signal is located in the right sideband of the to-be-transmitted OFDM signal, and the first signal is located in the intermediate frequency band in the to-be-transmitted OFDM signal other than the left sideband and the right sideband. The bandwidth of the first sideband signal and the bandwidth of the second sideband signal are both less than the bandwidth of the first signal. The first sideband signal is sampled by using the first sampling rate, and filtering processing of the first spectral mask, upsampling processing, and digital frequency conversion processing are performed on the sampled signal, to generate the first f-OFDM signal. The first signal is sampled by using the second sampling rate, and filtering processing of the second spectral mask is performed on the sampled signal, to generate the second f-OFDM signal. The second sideband signal is sampled by using the third sampling rate, and filtering processing of the third spectral mask, upsampling processing, and digital frequency conversion processing are performed on the sampled signal, to generate the third f-OFDM signal. The first f-OFDM signal, the second f-OFDM signal, and the third f-OFDM signal are superposed to obtain the f-OFDM signal, and the f-OFDM signal is transmitted. The first sampling rate and the third sampling rate are both less than the second sampling rate. The bandwidth of the transition band of the first f-OFDM signal and the bandwidth of the transition band of the third f-OFDM signal are both less than the preset threshold. The bandwidth of the transition band of the second f-OFDM signal is greater than the preset threshold. In this way, compared with the prior art, in the present application, an OFDM broadband signal is divided into two sideband signals and one intermediate signal. Filtering processing of a spectral mask with a relatively narrow transition band is performed on the two sideband signals. Filtering processing of a spectral mask with a relatively broad transition band is performed on the intermediate signal. The sideband signal is at an edge location. Therefore, even though filtering needs to be performed by means of shaping filtering, to obtain a very narrow transition band and achieve excellent out-of-band performance, because a bandwidth of a sideband is relatively narrow and a sampling rate is low, a work sampling rate of digital shaping filtering can be well reduced, and filtering is easily implemented. In addition, although a bandwidth of the intermediate signal is relatively broad and a sampling rate is relatively high, because the intermediate signal is located in the middle, the intermediate signal does not have a high requirement on performance of the transition band, and the transition band may be very broad, filtering may be performed by means of shaping filtering with a very low order, and filtering is easily implemented. Therefore, considering the entire technical solution provided by the present application, filtering complexity can be well reduced.

It may be understood that the foregoing process is mainly for transmission of a downlink signal. During communication, in a reverse process of the process of sending a downlink signal, a same transmitting device may also be used as a receiving device, to receive an uplink signal that is sent by a peer end after the foregoing processing. When receiving the uplink signal, processing performed by the receiving device on the uplink signal may be a reverse process of processing performed on a downlink signal, or there may be some differences. Specifically, Embodiment 3 further provides a receiver 40 below, configured to process a received f-OFDM signal.

Embodiment 3

Figure 17:
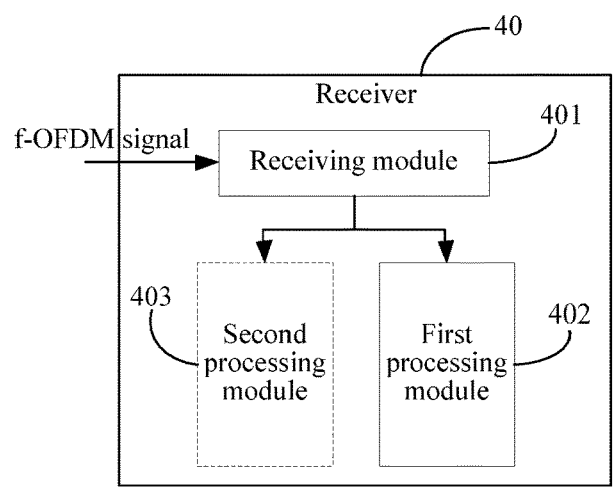
FIG. 17 is a structural diagram of a receiver 40 according to an embodiment of the present application.

FIG. 17 is a structural diagram of a receiver 40 according to an embodiment of the present application. As shown in FIG. 17, the receiver 40 may include:

a receiving module 401, configured to receive the f-OFDM signal; and a first processing module 402, configured to process, based on a preset signal processing policy, the f-OFDM signal received by the receiving module, to obtain an OFDM signal, where the signal processing policy is:

performing digital frequency conversion processing, downsampling processing, and filtering processing of a first spectral mask on the received f-OFDM signal, to filter out a first sideband signal;

performing filtering processing of a second spectral mask on the received f-OFDM signal, to filter out a first signal;

performing digital frequency conversion processing, downsampling processing, and filtering processing of a third spectral mask on the received f-OFDM signal, to filter out a second sideband signal; and superposing the first sideband signal, the first signal, and the second sideband signal to obtain an OFDM signal corresponding to the received f-OFDM signal, where the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband; and a bandwidth of the first spectral mask and a bandwidth of the third spectral mask are both less than a bandwidth of the second spectral mask, and a transition band of the first spectral mask and a transition band of the third spectral mask are both less than a transition band of the second spectral mask.

Digital frequency conversion when the first sideband signal is filtered out may be: performing up-conversion on the f-OFDM signal, and moving a center frequency of the f-OFDM signal to a center frequency of the first sideband signal. Downsampling means: sampling a signal on which digital frequency conversion has been performed, so that a sampling rate of the sampled signal is less than a sampling rate of the signal on which digital frequency conversion has been performed. Optionally, the sampling rate of the sampled signal may be made equal to a first sampling rate used during signal transmission.

Digital frequency conversion when the second sideband signal is filtered out may be: performing down-conversion on the f-OFDM signal, and moving a center frequency of the f-OFDM signal to a center frequency of the second sideband signal. Downsampling means: sampling a signal on which digital frequency conversion has been performed, so that a sampling rate of the sampled signal is less than a sampling rate of the signal on which digital frequency conversion has been performed. Optionally, the sampling rate of the sampled signal may be made equal to a third sampling rate used during signal transmission.

Further, if the receiver processes received M OFDM signals with contiguous frequencies that include the f-OFDM, where M is an integer greater than or equal to 2, and if transition bands of the M f-OFDM signals all meet the first preset threshold, the first processing module 402 may be further configured to:

separately process the M f-OFDM signals based on the preset signal processing policy, to obtain M OFDM signals.

Further, if a first group of f-OFDM signals exist in the M f-OFDM signals, the first group of f-OFDM signals include i f-OFDM signals with contiguous frequencies, transition bands of the i f-OFDM signals do not meet the first preset threshold, transition bands of (M−i) f-OFDM signals in the M f-OFDM signals other than the i signals meet the first preset threshold, and 2≤i≤M, the first processing module 402 may be further configured to:

process each of the (M−i) f-OFDM signals based on the signal processing policy, to obtain (M−i) OFDM signals; and as shown in FIG. 17, the receiver may further include:

a second processing module 403, configured to perform filtering processing of a fourth spectral mask on each of the i f-OFDM signals, to obtain i OFDM signals, where a bandwidth of a transition band of the fourth spectral mask is greater than a second preset threshold.

Not all bandwidths of the M f-OFDM signals are the same, or bandwidths of the M f-OFDM signals are completely the same, or bandwidths of the M f-OFDM signals are different from each other.

It can be learned from the foregoing that this embodiment of the present application provides the receiver, configured to process the received filtered-orthogonal frequency division multiplexing f-OFDM signal, where the transition band of the f-OFDM signal meets the first preset threshold. The receiver includes: the receiving module and the first processing module. The receiving module is configured to receive the f-OFDM signal. The first processing module is configured to process, based on the preset signal processing policy, the f-OFDM signal received by the receiving module, to obtain the OFDM signal. The signal processing policy is: performing digital frequency conversion processing, downsampling processing, and filtering processing of the first spectral mask on the received f-OFDM signal, to filter out the first sideband signal; performing filtering processing of the second spectral mask on the received f-OFDM signal, to filter out the first signal; performing digital frequency conversion processing, downsampling processing, and filtering processing of the third spectral mask on the received f-OFDM signal, to filter out the second sideband signal; and superposing the first sideband signal, the first signal, and the second sideband signal to obtain the OFDM signal corresponding to the received f-OFDM signal. In this way, filtering processing of a spectral mask with a relatively narrow transition band is performed on the two sideband signals of the received f-OFDM signal, and filtering processing of a spectral mask with a relatively broad transition band is performed on the intermediate signal, so that filtering complexity can be well reduced.

It may be clearly understood by persons skilled in the art that, for the purpose of convenient and brief description, for a detailed working process of the foregoing unit and system, reference may be made to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Persons of ordinary skill in the art may understand that all or a part of the steps of the methods in the embodiments may be implemented by a program instructing relevant hardware. The program may be stored in a computer readable storage medium. The storage medium may include: a read-only memory, a random-access memory, a magnetic disk, or an optical disc.

Finally, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A signal processing method, comprising:
processing an orthogonal frequency division multiplexing (OFDM) signal based on applying a filtering policy, to obtain a fourth filtered-OFDM (f-OFDM) signal; and
transmitting the fourth f-OFDM signal,
wherein applying the filtering policy comprises:
dividing a to-be-transmitted OFDM signal into a first sideband signal, a first signal, and a second sideband signal, wherein the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal;
sampling the first sideband signal by using a first sampling rate, and performing filtering processing of a first spectral mask, upsampling processing, and digital frequency conversion processing on the sampled signal by using the first sampling rate, to generate a first f-OFDM signal;
sampling the first signal by using a second sampling rate, and performing filtering processing of a second spectral mask on the sampled signal by using the second sampling rate, to generate a second f-OFDM signal;
sampling the second sideband signal by using a third sampling rate, and performing filtering processing of a third spectral mask, upsampling processing, and digital frequency conversion processing on the sampled signal by using the third sampling rate, to generate a third f-OFDM signal; and
superposing the first f-OFDM signal, the second f-OFDM signal, and the third f-OFDM signal to obtain the fourth f-OFDM signal,
wherein the first sampling rate and the third sampling rate are both less than the second sampling rate;
wherein a transition band of the first spectral mask and a transition band of the third spectral mask are both less than a transition band of the second spectral mask; and
wherein the first spectral mask, the second spectral mask, and the third spectral mask are used to ensure that an out-of-band leakage of the fourth f-OFDM signal meets a first preset threshold.

2. The signal processing method according to claim 1, wherein the method is further used to transmit M OFDM signals with contiguous frequencies that comprise the OFDM signal, wherein M is an integer greater than or equal to 2, and wherein parameters of the M OFDM signals are different from each other, the method further comprising:
separately processing the M OFDM signals based on the filtering policy, to obtain M f-OFDM signals; and
superposing the M f-OFDM signals and transmitting the superposed M f-OFDM signals.

3. The signal processing method according to claim 1, wherein the method is further used to transmit M OFDM signals with contiguous frequencies that comprise the OFDM signal, wherein M is an integer greater than or equal to 2, and wherein a first group of OFDM signals exists in the M OFDM signals, the first group of OFDM signals comprises i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and 2≤i≤M, the method further comprising:
processing a first OFDM signal in the i OFDM signals based on the filtering policy, to obtain an f-OFDM signal corresponding to the first OFDM signal, wherein the first OFDM signal is located in a first edge of the i OFDM signals with contiguous frequencies; processing a second OFDM signal in the i OFDM signals based on the filtering policy, to obtain an f-OFDM signal corresponding to the second OFDM signal, wherein the second OFDM signal is located in a second edge of the i OFDM signals with contiguous frequencies;
separately performing filtering processing of a fourth spectral mask on each of the i OFDM signals other than the first OFDM signal and the second OFDM signal, to obtain (i−2) f-OFDM signals, wherein a bandwidth of a transition band of the fourth spectral mask is greater than a second preset threshold;
separately processing the (M−i) OFDM signals based on the filtering policy, to obtain (M−i) f-OFDM signals; and
superposing the f-OFDM signal corresponding to the first OFDM signal, the f-OFDM signal corresponding to the second OFDM signal, the (i−2) f-OFDM signals, and the (M−i) f-OFDM signals, and transmitting the superposed f-OFDM signals.

4. The signal processing method according to claim 2, wherein
not all bandwidths of the M OFDM signals are the same, or
bandwidths of the M OFDM signals are completely the same, or
bandwidths of the M OFDM signals are different from each other.

5. The signal processing method according to claim 3, wherein
not all bandwidths of the M OFDM signals are the same, or
bandwidths of the M OFDM signals are completely the same, or
bandwidths of the M OFDM signals are different from each other.

6. A signal processing method, used to process a received filtered-orthogonal frequency division multiplexing (f-OFDM) signal, wherein a transition band of the f-OFDM signal meets a first preset threshold, and the method comprises:
processing the received f-OFDM signal based on applying a signal processing policy, to obtain an OFDM signal, wherein applying the signal processing policy comprises:
performing digital frequency conversion processing, downsampling processing, and filtering processing of a first spectral mask on the received f-OFDM signal, to filter out a first sideband signal;

performing filtering processing of a second spectral mask on the received f-OFDM signal, to filter out a first signal;

performing digital frequency conversion processing, downsampling processing, and filtering processing of a third spectral mask on the received f-OFDM signal, to filter out a second sideband signal; and superposing the first sideband signal, the first signal, and the second sideband signal to obtain the OFDM signal corresponding to the received f-OFDM signal, wherein the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband, wherein a bandwidth of the first spectral mask and a bandwidth of the third spectral mask are both less than a bandwidth of the second spectral mask, and wherein a transition band of the first spectral mask and a transition band of the third spectral mask are both less than a transition band of the second spectral mask.

7. The signal processing method according to claim 6, wherein the method is further used to process received M OFDM signals with contiguous frequencies that comprise the f-OFDM signal, wherein M is an integer greater than or equal to 2, and wherein transition bands of the M f-OFDM signals meet the first preset threshold, the method further comprising:

separately processing the M f-OFDM signals based on the met signal processing policy, to obtain M OFDM signals.

8. The signal processing method according to claim 6, wherein the method is further used to process received M OFDM signals with contiguous frequencies that comprise the f-OFDM signal, wherein M is an integer greater than or equal to 2, and wherein a first group of f-OFDM signals exists in the M f-OFDM signals, the first group of f-OFDM signals comprises i f-OFDM signals with contiguous frequencies, transition bands of the i f-OFDM signals do not meet the first preset threshold, transition bands of (M−i) f-OFDM signals in the M f-OFDM signals other than the i signals meet the first preset threshold, and 2≤i≤M, the method further comprising:

performing filtering processing of a fourth spectral mask on each of the i f-OFDM signals, to obtain i OFDM signals, wherein a bandwidth of a transition band of the fourth spectral mask is greater than a second preset threshold; and processing each of the (M−i) f-OFDM signals based on the signal processing policy, to obtain (M−i) OFDM signals.

9. The signal processing method according to claim 7, wherein not all bandwidths of the M f-OFDM signals are the same, or bandwidths of the M f-OFDM signals are completely the same, or bandwidths of the M f-OFDM signals are different from each other.

10. The signal processing method according to claim 8, wherein not all bandwidths of the M f-OFDM signals are the same, or bandwidths of the M f-OFDM signals are completely the same, or bandwidths of the M f-OFDM signals are different from each other.

11. A device, comprising:

a processor configured to apply a filtering policy to filter an orthogonal frequency division multiplexing (OFDM) signal, to obtain a fourth filtered-OFDM (f-OFDM) signal; and a transmitter configured to transmit the fourth f-OFDM signal;

wherein applying the filtering policy comprises:

dividing a to-be-transmitted OFDM signal into a first sideband signal, a first signal, and a second sideband signal, wherein the first sideband signal is located in a left sideband of the to-be-transmitted OFDM signal, the second sideband signal is located in a right sideband of the to-be-transmitted OFDM signal, the first signal is located in an intermediate frequency band in the to-be-transmitted OFDM signal other than the left sideband and the right sideband, and a bandwidth of the first sideband signal and a bandwidth of the second sideband signal are both less than a bandwidth of the first signal;

sampling, by using a first sampling rate, the first sideband signal obtained through division by the signal division unit, and perform filtering processing of a first spectral mask, upsampling processing, and digital frequency conversion processing on the sampled signal by using the first sampling rate, to generate a first f-OFDM signal;

sampling, by using a second sampling rate, the first signal obtained through division by the signal division unit, and perform filtering processing of a second spectral mask on the sampled signal by using the second sampling rate, to generate a second f-OFDM signal; and sampling, by using a third sampling rate, the second sideband signal obtained through division by the signal division unit, and perform filtering processing of a third spectral mask, upsampling processing, and digital frequency conversion processing on the sampled signal by using the third sampling rate, to generate a third f-OFDM signal; and superimposing the first f-OFDM signal, the second f-OFDM signal, and the third f-OFDM signal that are obtained through filtering by the filter unit, to obtain the fourth f-OFDM signal, wherein the first sampling rate and the third sampling rate are both less than the second sampling rate;

wherein a transition band of the first spectral mask and a transition band of the third spectral mask are both less than a transition band of the second spectral mask; and wherein the filtering processing of the first spectral mask, the filtering processing of the second spectral mask, and the filtering processing of the third spectral mask are used to ensure that an out-of-band leakage of the fourth f-OFDM signal meets a first preset threshold.

12. The device according to claim 11, wherein the transmitter is further configured to transmit M OFDM signals with contiguous frequencies that comprise the OFDM signal, wherein M is an integer greater than or equal to 2, and wherein parameters of the M OFDM signals are different from each other;

wherein the processor is further configured to separately process the M OFDM signals, to obtain M f-OFDM signals; and the transmitter is further configured to superpose the M f-OFDM signals obtained by the processor, and transmit the superposed M f-OFDM signals.

13. The device according to claim 11,
wherein the transmitter is further configured to transmit M OFDM signals with contiguous frequencies that comprise the OFDM signal, wherein M is an integer greater than or equal to 2, and wherein a first group of OFDM signals exists in the M OFDM signals, the first group of OFDM signals comprises i OFDM signals with contiguous frequencies, parameters of the i OFDM signals are the same, parameters of (M−i) of the M OFDM signals other than the i signals are different from each other, a parameter of each of the (M−i) OFDM signals is different from the parameters of the i OFDM signals, and $2 \le i \le M$,
wherein the processor is further configured to:
    filter a first OFDM signal in the i OFDM signals, to obtain an f-OFDM signal corresponding to the first OFDM signal, wherein the first OFDM signal is located in a first edge of the i OFDM signals with contiguous frequencies;
    filter a second OFDM signal in the i OFDM signals, to obtain an f-OFDM signal corresponding to the second OFDM signal, wherein the second OFDM signal is located in a second edge of the i OFDM signals with contiguous frequencies; and
    separately filter the (M−i) OFDM signals, to obtain (M−i) f-OFDM signals;
    separately perform filtering processing of a fourth spectral mask on each of the i OFDM signals other than the first OFDM signal and the second OFDM signal, to obtain (i−2) f-OFDM signals, wherein a bandwidth of a transition band of the fourth spectral mask is greater than a second preset threshold; and
wherein the transmitter is further configured to superpose the f-OFDM signal corresponding to the first OFDM signal, the f-OFDM signal corresponding to the second OFDM signal, the (i−2) f-OFDM signals, and the (M−i) f-OFDM signals, and transmit the superposed f-OFDM signals.

14. The device according to claim 12, wherein
not all bandwidths of the M OFDM signals are the same, or
bandwidths of the M OFDM signals are completely the same, or
bandwidths of the M OFDM signals are different from each other.

15. The device according to claim 13, wherein
not all bandwidths of the M OFDM signals are the same, or
bandwidths of the M OFDM signals are completely the same, or
bandwidths of the M OFDM signals are different from each other.

16. A device, comprising:
a receiver configured to receive a filtered-orthogonal frequency division multiplexing (f-OFDM) signal, wherein a transition band of the f-OFDM signal meets a first preset threshold; and
a processor configured to apply a single processing policy to the received f-OFDM signal to obtain an OFDM signal,
wherein applying the signal processing policy comprises:
    performing digital frequency conversion processing, downsampling processing, and filtering processing of a first spectral mask on the received f-OFDM signal, to filter out a first sideband signal;
    performing filtering processing of a second spectral mask on the received f-OFDM signal, to filter out a first signal;
    performing digital frequency conversion processing, downsampling processing, and filtering processing of a third spectral mask on the received f-OFDM signal, to filter out a second sideband signal; and
    superposing the first sideband signal, the first signal, and the second sideband signal to obtain the OFDM signal corresponding to the received f-OFDM signal, wherein the first sideband signal is located in a left sideband of the OFDM signal obtained after the superposing, the second sideband signal is located in a right sideband of the OFDM signal obtained after the superposing, and the first signal is located in an intermediate frequency band in the OFDM signal obtained after the superposing other than the left sideband and the right sideband,
wherein a bandwidth of the first spectral mask and a bandwidth of the third spectral mask are both less than a bandwidth of the second spectral mask, and
wherein a transition band of the first spectral mask and a transition band of the third spectral mask are both less than a transition band of the second spectral mask.

17. The device according to claim 16, wherein the processor is further configured to:
process received M OFDM signals with contiguous frequencies that comprise the f-OFDM signal, wherein M is an integer greater than or equal to 2, and transition bands of the M f-OFDM signals meet the first preset threshold, and
separately process the M f-OFDM signals based on the signal processing policy to obtain M OFDM signals.

18. The device according to claim 16, wherein the processor is further configured to:
process received M OFDM signals with contiguous frequencies that comprise the f-OFDM signal, wherein M is an integer greater than or equal to 2, and wherein if a first group of f-OFDM signals exist in the M f-OFDM signals, the first group of f-OFDM signals comprise i f-OFDM signals with contiguous frequencies, transition bands of the i f-OFDM signals do not meet the first preset threshold, transition bands of (M−i) f-OFDM signals in the M f-OFDM signals other than the i signals meet the first preset threshold, and $2 \le i \le M$;
process each of the (M−i) f-OFDM signals based on the signal processing policy, to obtain (M−i) OFDM signals; and
perform filtering processing of a fourth spectral mask on each of the i f-OFDM signals, to obtain i OFDM signals, wherein a bandwidth of a transition band of the fourth spectral mask is greater than a second preset threshold.

19. The device according to claim 17, wherein
not all bandwidths of the M f-OFDM signals are the same, or
bandwidths of the M f-OFDM signals are completely the same, or
bandwidths of the M f-OFDM signals are different from each other.

20. The device according to claim 18, wherein
not all bandwidths of the M f-OFDM signals are the same, or
bandwidths of the M f-OFDM signals are completely the same, or bandwidths of the M f-OFDM signals are different from each other.

* * * * *